(12) United States Patent  
Suzuki et al.

(10) Patent No.: US 6,437,824 B1  
(45) Date of Patent: Aug. 20, 2002

(54) IMAGE PICKUP APPARATUS AND SYSTEM

(75) Inventors: Yasuo Suzuki, Kamakura; Hisashi Kawai; Takayuki Komine, both of Kawasaki; Hitoshi Yasuda; Kunihiko Tabei, both of Yokohama, all of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/018,006

(22) Filed: Feb. 3, 1998

(30) Foreign Application Priority Data

| Feb. 7, 1997 | (JP) | 9-025174 |
| Feb. 19, 1997 | (JP) | 9-035055 |
| Feb. 21, 1997 | (JP) | 9-037700 |
| Feb. 21, 1997 | (JP) | 9-037708 |
| Feb. 21, 1997 | (JP) | 9-037710 |
| Jun. 17, 1997 | (JP) | 9-160196 |

(51) Int. Cl.[7] .................. H04N 5/335; H04N 5/228  
(52) U.S. Cl. .................... 348/222; 348/500  
(58) Field of Search ................ 348/207, 211, 348/212, 213, 222, 294, 295, 311, 312, 65, 500, 518, 521, 505, 516; H04N 5/335

(56) References Cited

U.S. PATENT DOCUMENTS

| 5,389,968 A | 2/1995 | Koyanagi et al. |
| 5,550,586 A | 8/1996 | Kudo et al. |
| 5,585,840 A | 12/1996 | Watanabe et al. |
| 5,696,553 A | * 12/1997 | D'Alfonso et al. ......... 348/211 |
| 6,151,071 A | * 11/2000 | Petilli ........................ 348/312 |

FOREIGN PATENT DOCUMENTS

| DE | 40 30 148 A1 | 3/1992 |
| EP | 0 674 435 A1 | 9/1995 |
| EP | 0 748-132 A2 | 12/1996 |
| GB | 1 543 555 | 4/1979 |

OTHER PUBLICATIONS

JP 04287489 Abstract, Oct. 13, 1992.  
JP 06205412 (Abstract).  
Imaide et al., "A Multimedia Color Camera Providing Multi–Format Digital Images," *IEEE Transactions on Consumer Electronics*, vol. 39, No. 3 (1993), pp. 467–472.

* cited by examiner

*Primary Examiner*—Tuan Ho  
(74) *Attorney, Agent, or Firm*—Morgan & Finnegan, LLP

(57) ABSTRACT

A camera section for photographing an object to generate a video signal is connected via a cable to a video signal processing section that receives and processes the video signal. When the camera section is replaced with a different one, signals corresponding to the new camera section are automatically provided. A video signal, a synchronizing signal therefor, a clock signal, and control data are multiplexed on a signal line in the cable and the signal obtained is transmitted from the camera section to the video signal processing section, and control data is sent from the video signal processing section to the camera section. These control data are transmitted during a vertical interval of the video signal, and a DC voltage is supplied to the camera section from the video signal processing section via a shield line that is paired with the signal line in the cable.

5 Claims, 32 Drawing Sheets

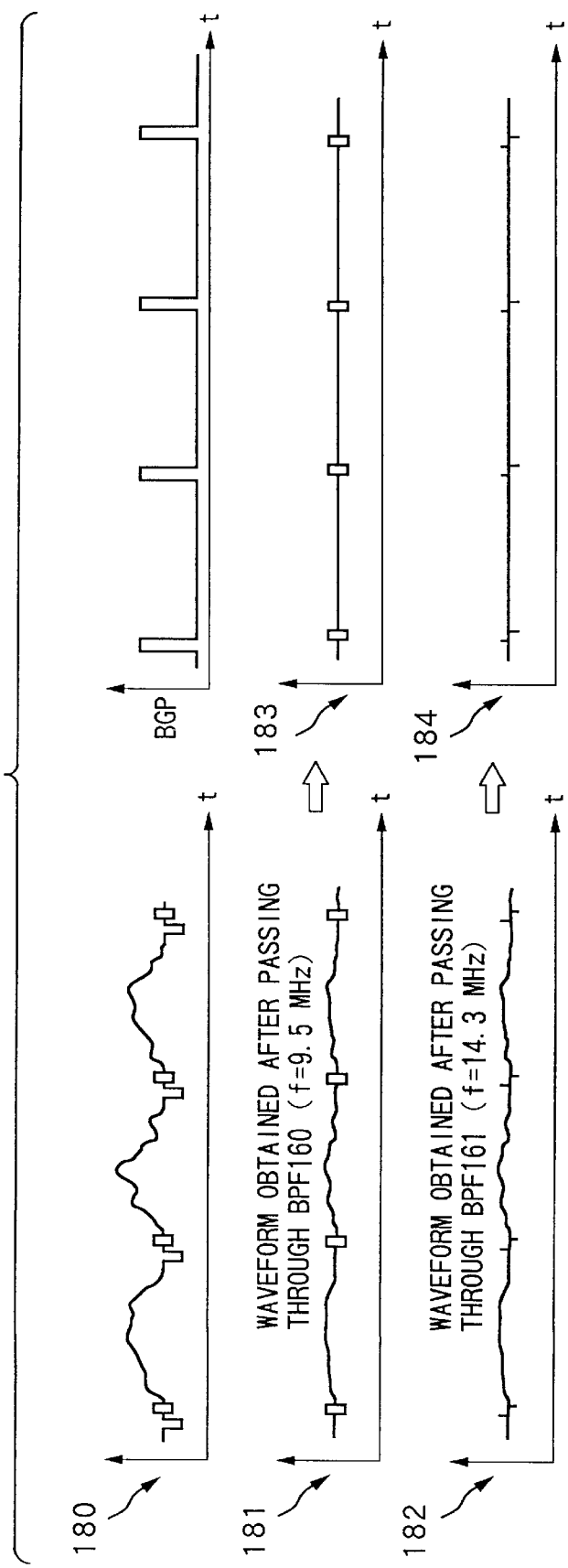

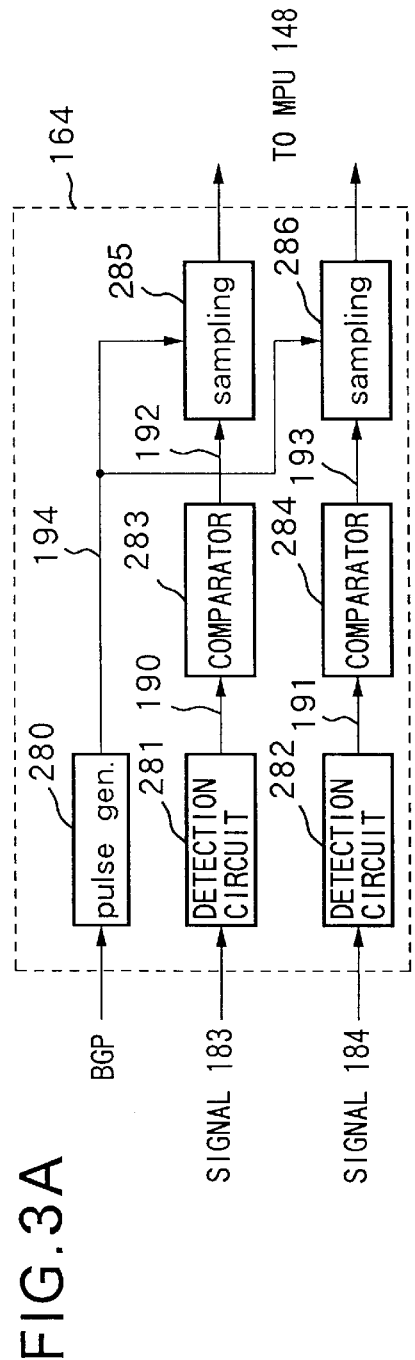
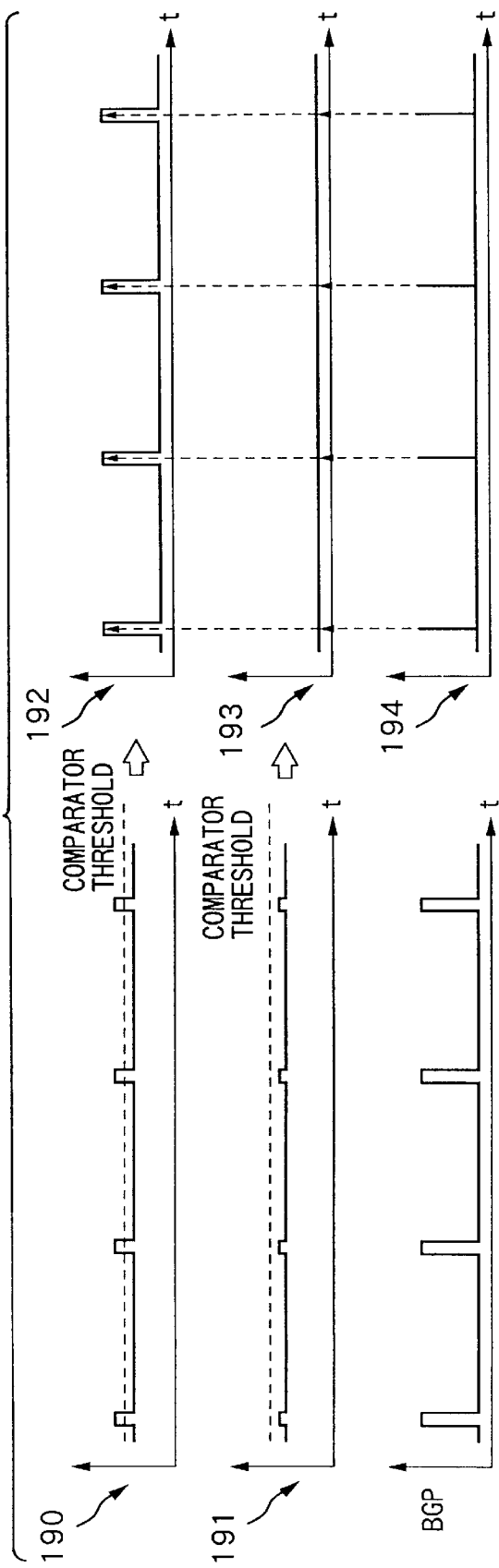
FIG.3A
FIG.3B

PRIOR ART

IMAGE PICKUP APPARATUS AND SYSTEM

BACKGROUND OF THE INVENTION

The present invention relates to an image pickup apparatus and system that photographs an object to output a video signal, and in particular, to an image pickup apparatus with a separated image pickup section in which the image pickup section and a signal processing section are connected together via a cable or by radio as well as an image pickup system using this apparatus.

FIG. 28 is a block diagram showing a system configuration of a conventional general image input apparatus. In this figure, numeral 301 denotes a system control section for controlling the entire system; numeral 303 denotes an optical lens system including a zoom lens, a zoom motor that drives the zoom lens, a focus lens, and a focus motor that drives the focus lens; numeral 304 denotes an iris that adjusts the amount of incident light passing through the optical lens system 303; numeral 305 denotes a CCD that is an image pickup element; and numeral 306 denotes a timing generator (hereafter referred to as a "TG") for controlling the CCD 305.

Reference numeral 307 denotes an S/H&AGC circuit for performing a sampling and holding operation to reduce noise from stored charges in the CCD 305 and adjusting the gain of an image pickup signal; numeral 308 denotes an A/D converter for converting an analog signal from the S/H&AGC circuit 307 into a digital signal; numeral 309 denotes a signal processing circuit for executing required signal processing to convert a digital signal from the A/D converter 308 into a video signal to output various information required to control auto-focus (AF), auto-exposure (AE), and auto-white-balance (AW).

The image input apparatus is integral and comprises an image pickup section and a signal processing section that are integrated together. The system control section 301 comprises a control data sampling module for sampling control data from the signal processing circuit 309, an AF control module, an AE control module, and an AW control module.

In such a conventional integral image input apparatus, the system control section 301 obtains various control data from the signal processing section 309 (the control data sampling module) and based on this information, controls the zoom control module for controlling the zoom lens in the system control section 301, the AF control module for controlling the focus and the AE control module for controlling the iris 304, TG 306, and S/H&AGC circuit 307 to maintain the signal level at a constant level.

The present day is called the "multimedia age" and the image input apparatus is used for various applications. One example is a television conference system. Image input apparatuses used for such a system have different functions for different applications. For example, a single focus camera is sufficient to photograph a single person while a camera with a tripod head or a zoom lens is required to photograph several people.

In the above conventional example, however, since the camera section that is the image pickup section is integrated with the camera signal processing section, all components of the image input apparatus must be replaced when it is used for different applications.

In view of this point, for an image pickup apparatus using a charge coupled device (hereafter referred to as a "CCD") as an image pickup element, an apparatus called a head-separated camera has been proposed in which an image pickup section including a CCD and a signal processing section for processing a video signal from the CCD to output it as a video signal are separated from each other and connected to each other via a cable.

With the improvement of recent electronic technology, the size and weight of camera apparatuses using the CCD are being reduced. In particular, the improvement of semiconductor technology has contributed to the development of apparatuses for executing the A/D conversion of a video signal at a high speed and using a DSP (a Digital Signal Processing circuit) to process and output the digitalized video signal.

Such conventional head-separated cameras, however, require a large number of signal lines used to transmit video signals, various synchronizing signals in synchronism with the video signals, and various control commands for panning, tilting, and zooming the camera, between the camera head section and the signal processing section. In addition, the camera head section typically has no power supply unit for supplying electric power, so these cameras require a power supply line for supplying power from the signal processing section as well as the signal line described above.

In addition, if an attempt is made to separate the image pickup section from the image processing section with the VCR circuit configuration unchanged, control data transmitted between a controller for the image pickup section and a controller for the signal processing section will leak into a video signal to degrade it.

To avoid this condition, tight shielding can be provided to prevent signals from affecting each other but this requires a thick and hard cable to connect these sections together, resulting in degraded usability.

FIG. 29 shows a configuration of a conventional camera section (an image pickup section) 1.

In FIG. 29, the camera section 1 has a zoom lens 10; an iris 11; an optical lowpass filter and infrared cut filter 12; a CCD 13; a CDS circuit 14; an AGC circuit 15; an addition circuit 16 for adding a CCD signal, a composite synchronizing signal, and a burst clock together; a drive circuit 17 for driving, for example, a 75-Ω coaxial line 2: a synchronizing signal generator (SSG) 19; an MPU micro processing unit 20 for controlling the entire camera section 1; and a burst gate (BG) circuit 18 for applying a gate to add a burst clock to a video signal.

The cable 2 connects the camera section 1 to an image processing section (a signal processing section) 3, which is described below.

Reference numeral 30 denotes a terminal for outputting a video signal to which a clock and a composite synchronizing signal are added; numeral 31 denotes a terminal for outputting a transmit signal used to communicate with the image processing section 3; and numeral 32 denotes a terminal for inputting a receive signal used to communicate with the image processing section 3.

The operation is described with reference to FIGS. 29 to 31. A CCD image pickup signal (a video signal) is obtained via the zoom lens 10, iris 11, optical lowpass filter and infrared cut filter 12, CCD 13, CDS circuit 14, and AGC circuit 15. The synchronizing signal generator 19 outputs various synchronizing pulses and composite synchronizing signals used for CCD photographing, burst gate pulses (BGP), and a clock used as a reference for photographing. Based on the BGP from the synchronizing signal generator 19, the burst gate (BG) circuit 18 executes gating so as to change a continuously input clock into a burst clock suitable for addition to a video signal. The addition circuit 16 adds together a video signal output from the AGC control circuit 15, a burst clock from the BG circuit 18, and a composite synchronizing signal from the synchronizing signal generator 19. After addition, the video signal is driven by the 75-Ω drive circuit 17 and output to the image processing section 3 from an output terminal 30. FIG. 30 shows part of a video signal to which a burst clock and a composite synchronizing signal are added. "A" shows a composite synchronizing signal, "B" shows a burst clock, and "C" shows a video signal area. The MPU 20 uses an output terminal 31 and an input terminal 32 to communicate with an MPU in the image processing section 3 in order to drive the zoom and auto-focus lenses and to control the iris and AGC.

FIG. 31 shows a configuration of a conventional image processing section 3. The image processing section 3 is shaped like an extension board of a computer and inserted into an extension board slot in the computer.

The image processing section 3 has a buffer circuit 39 for a video signal 30; a clamp circuit 40; an AD converter 41; a digital signal processing (DSP) circuit 42 for executing digital signal processing such as filtering, color separation, gamma correction, matrix operation, or clipping; a DA converter 43 for executing the digital-analog conversion of a digitalized signal to output a video signal (for example, NTSC); an MPU 48 for controlling the entire image processing section 3; a synchronization separation circuit 44; a synchronizing signal generator 45; a band path filter (BPF) 46; a burst gate (BG) circuit 47, and PLL (Phase Locked Loop) circuit 49.

Reference numeral 30 denotes a terminal for inputting a video signal to which a clock and a composite synchronizing signal are added; numeral 31 denotes a terminal for inputting a receive signal used to communicate with the camera section 1; and numeral 32 denotes a terminal for outputting a transmit signal used to communicate with the camera section 1.

The operation in FIG. 31 is described. A video signal that has passed through the buffer circuit 39 and clamp circuit 40 is input to the AD converter 41, synchronization separation circuit 44, and the band path filter (BPF) 46. The synchronization separation circuit 44 generates from the input video signal an HD (horizontal synchronization) signal, a VD (vertical synchronization) signal, and a burst gate pulse (BGP). The HD and VD signals are input to reset terminals of a horizontal and a vertical synchronization counters (not shown) in the synchronizing signal generator 45 to provide horizontal and vertical synchronization with the camera section 1. The HD and VD signals in synchronism with the camera section 1 are input to the DSP circuit 42. After the video signal has been input to the BPF 46, almost all of the synchronizing signal and video signal are attenuated to allow only frequencies near the burst clock to pass through. After passing through the BPF 46, the signal is input to the BG circuit 47, where based on a BGP generated by the synchronization separation circuit 44, noise components remaining in the video signal are removed from the signal to extract only the burst clock, which is then input to the PLL circuit 49. The PLL circuit 49 comprises a phase comparison circuit (PC) 50, an LPF 51, and a voltage control oscillator (VCO) 52, and generates from the burst clock a clock (CLK) with a matching phase to output it to the synchronizing signal generator 45, AD converter 41, and DSP circuit 42. The video signal, which has been input to the AD converter 41, is converted into a digital signal, image-processed by the DSP circuit 42 in synchronism with a clock from the PLL circuit 49 and a synchronizing signal from the synchronizing signal generator 45, and then converted into an analog video signal (for example, an NTSC signal) by the DA converter 43 for output. In addition, the MPU 48 is electrically connected to a computer PC via a bus BUS and bidirectionally communicate in response to commands from the PC. The MPU 48 uses the output terminal 32 and the input terminal 31 to communicate with the MPU 20 in the camera section 1 in order to drive the zoom and auto-focus lenses and to control the iris and AGC.

Such a separated camera is characterized by the small size and weight of the camera section 1 and is advantageous in that the camera section 1 can be replaced depending on the application. For example, the image processing section 3 can be used in common while the camera section 1 can be changed, for example, between a single-focus camera and a zoom camera depending on the application.

This configuration, however, allows camera sections each including a CCD having the same number of pixels (resolution) to be replaced with each other, but if camera sections each including a CCD having a different number of pixels are replaced with each other, the image processing section 3 cannot reproduce a clock. This is due to the difference in clock frequency, which prevents the correspondence of the filter frequency when a burst clock is extracted from a video signal. That is, the conventional configuration does not allow replacement with a camera that uses a CCD having a different number of pixels.

In addition, one example of such an image pickup system is a television conference system. Most of such television conference systems can be classified into a larger conference room type that is housed in a cabinet and a cart type that is housed in a cart with wheels. With the recent spread of personal computers, however, attention has been paid to desk top conference systems using a personal computer. This system is composed of a video camera 9101; a personal computer extension board 9102 that obtains sounds and images, that compresses and expands data, and that executes communication; and software 9104, as shown in FIG. 32.

FIG. 33 is an outline drawing showing a desk top television conference system that uses the components 9101 to 9104 in a personal computer. In this figure, numeral 9105 denotes a personal computer body, numeral 9106 denotes a personal computer monitor, numeral 9107 denotes a keyboard, and 9108 denotes a mouse. FIG. 34 shows a state in which these components are electrically connected together. In this figure, the video camera 9101 has, for example, a tripod head and also has a video output terminal, an S video output terminal, an audio line output terminal, a DC power supply input terminal, and an RS232C control terminal. First, to supply DC power to the video camera 9101, DC power supply lines (a DC power supply and a ground lines) 9110 are connected to the video camera via an AC adapter 9109. Next, among the image outputs from the video camera 9101, for example, the S video output terminal is connected to an S video input terminal of the personal computer extension board 9102 via a video cable 9111. Then, an RS232C cable 9113 is used to connect an RS232C terminal of the personal computer body 9105 to an RS232C terminal of the video camera in order to control various functions for panning, tilting, and zooming the video camera.

Thus, the electric connections relating to the (1) power supply to the camera, the (2) video signal, and the (3) control signal have been finished, and after turning the power supply to the personal computer on, predetermined software can be driven to allow the apparatus to function as a desk top television conference system.

The connection cables used for the above electric connections can be summarized as follows.

(1) Two lines for the DC power supply lines 9110, i.e., one for DC power supply line and another for GND line.
(2) Four lines for the video cable 9111, i.e., one for Y video signal line, one for C video signal line, and two individual GND lines.
(3) Eight lines for the RS232C cables. For synchronous serial communication, only four lines including a TX line, an RX line, a clock line, and a GND line are required.

On the other hand, a head set having a conductive tripod head requires another cable between the head set and the extension board 9102. Thus, 3 types of cables and at least 9 signal lines are required.

The above conventional example has the following problems.

(1) The power supply cable 9110, video cable 9111, and RS232C cable 9113 are separately connected to the video camera 9101, thereby degrading the appearance of the camera and its reliability. That is, the disconnection of any one cable may result in an operational problem.
(2) Since the video cable 9111 and a cable for a head set with a tripod head are separately connected to the personal computer extension board 9102, the rear of the personal computer body 9105 on which the connections of these cables are provided also degrades the appearance of the body.
(3) The RS232C cable 9113 for controlling the video camera 9101 is connected to the RS232C terminal of the personal computer body 9105. This connection, however, is not preferable because this terminal may need to connect to other device such as a modem or printer.
(4) It is necessary to confirm that AC power is provided to the AC adapter 9109 and also to confirm that AC power is provided to the personal computer body 9105, and there are two AC power cables.

SUMMARY OF THE INVENTION

It is an object of this invention to provide an image pickup apparatus and system that can solve these problems.

It is another object of this invention to provide an image pickup apparatus and system that enables an image pickup section to be replaced with one with a different resolution.

It is still another object of this invention to provide an image pickup apparatus and system that superposes control data transmitted from a camera section to an image processing section, on a video signal on which a synchronizing signal and a clock are superposed, thereby reducing the number of communication cables between the camera section and the image processing section.

It is still another object of this invention to provide an image pickup apparatus that is preferably used for, for example, a television conference system and an image pickup system to which an image processing apparatus for processing photographed images is connected.

It is still another object of this invention to provide an image pickup apparatus and system that superposes a power supply line for supplying electric power from the image processing section to the image pickup unit, on a signal line paired with a signal line that superposes various synchronizing signals and a video signal, thereby reducing the number of lines between the image pickup unit and the image processing unit.

It is still another object of this invention to provide an image pickup apparatus and system that multiplexes a video signal, various synchronizing signals, and transmit and receive data to transmit the multiplexed signal via a signal line and that superposes a power supply voltage on a signal line that is paired with the above signal line, thereby reducing the number of lines.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 2 shows an example of an operation of a clock generating section in the image processing apparatus according to the first embodiment of this invention;

FIG. 3A shows an example of a configuration of a burst detection section according to the first embodiment of this invention;

FIG. 3B shows an example of a burst clock detection method using the configuration in FIG. 3A;

DETAILED DESCRIPTION OF THE PREFERRED EMBODIMENTS

The embodiments of this invention are described below in detail.

First Embodiment

Figure 1:
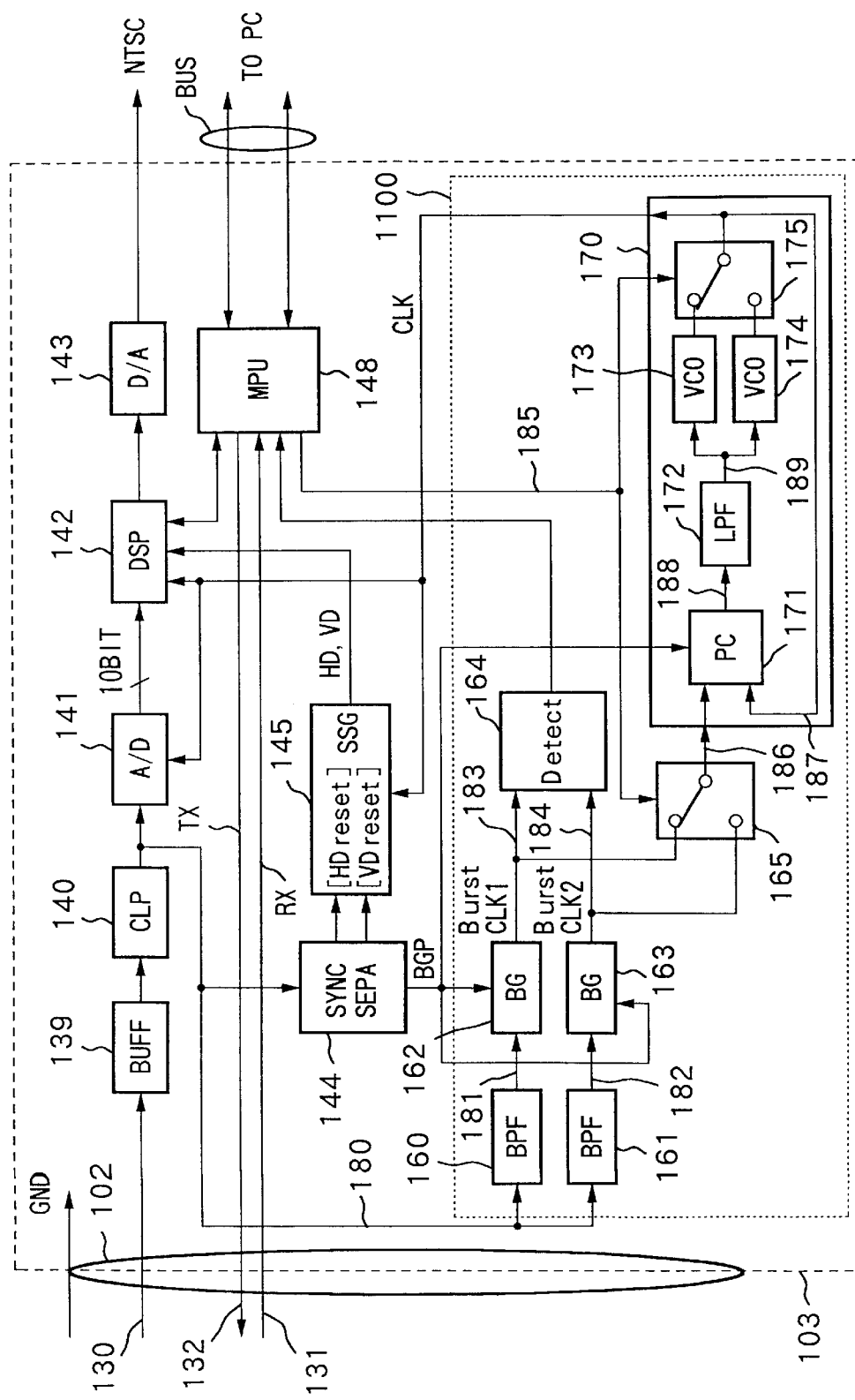
FIG. 1 shows an image processing section in an image processing apparatus according to a first embodiment of this invention.

FIG. 1 shows one embodiment of this invention. When inserted in an extension slot in a PC as an extension board or card, an image processing section 103 according to this embodiment bi-directionally communicates with the PC.

The image processing section 103 has a buffer (BUFF) circuit 139 for a video signal 130; a clamp (CLP) circuit 140; an AD converter 141; a digital signal processing (DSP) circuit 142 for executing digital signal processing such as filtering, color separation, gamma correction, matrix operation, or clipping; a DA converter 143 for executing the digital-analog conversion of a digitalized signal to output a video signal (for example, NTSC); an MPU 148 for controlling the entire image processing section 103; a synchronization separation circuit 144; a synchronizing signal generator 145; and a clock generating section 1100 for generating a clock from a burst clock, in which the phase of the clock corresponds to the phase of the burst clock.

Figure 29:
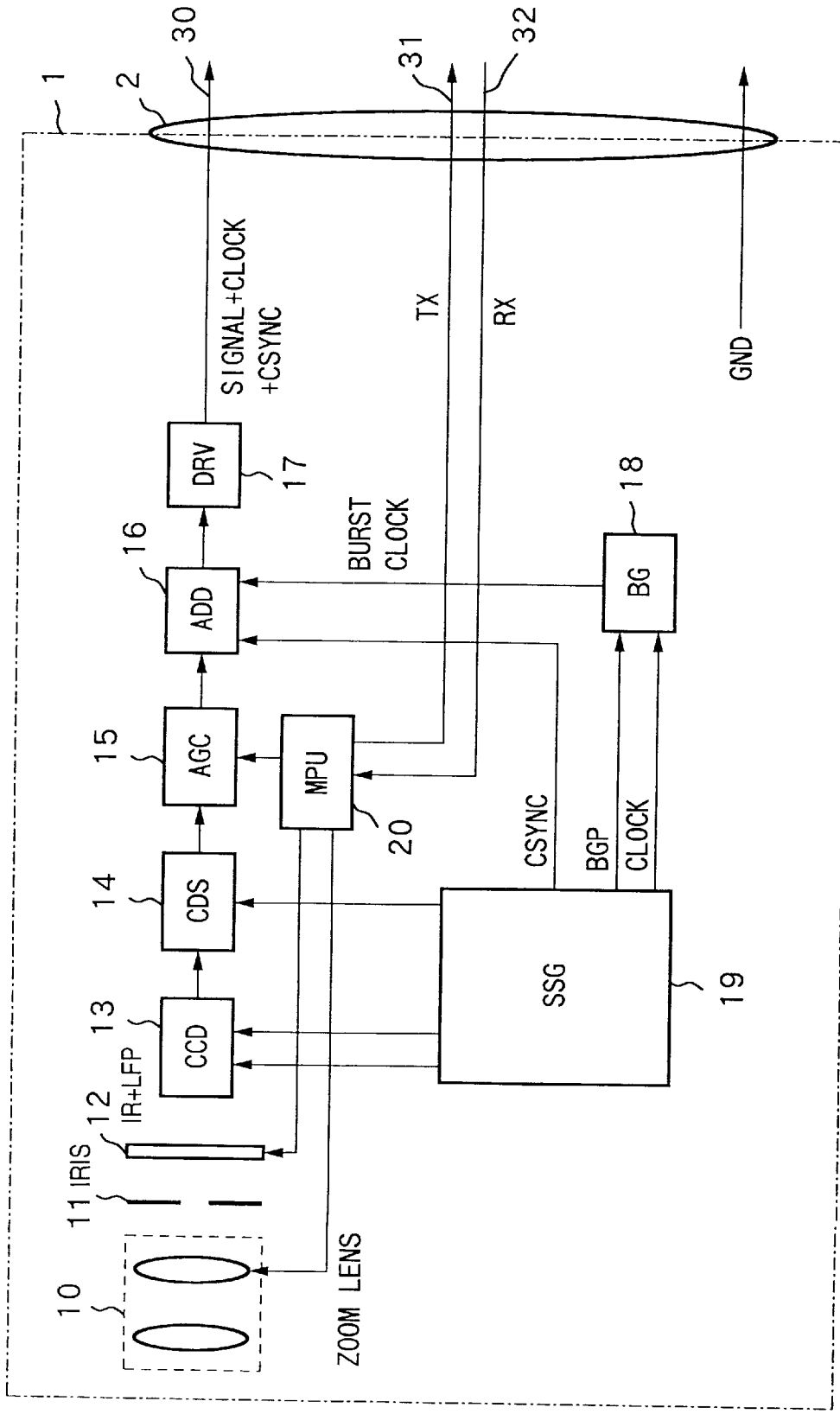
FIG. 29 shows a camera section of a conventional head-separated camera.
Figure 30:
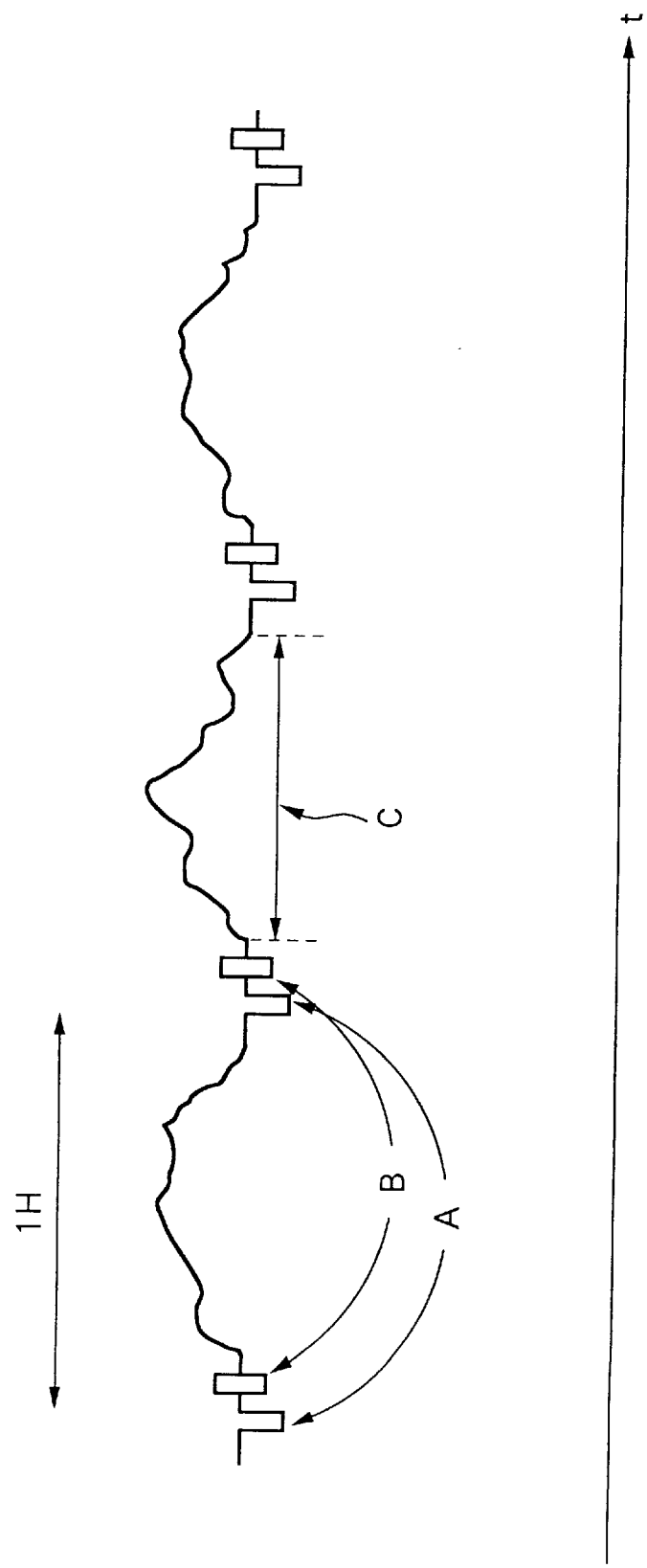
FIG. 30 shows parts of a video signal to which a burst clock and a composite synchronizing signal are added.
Figure 31:
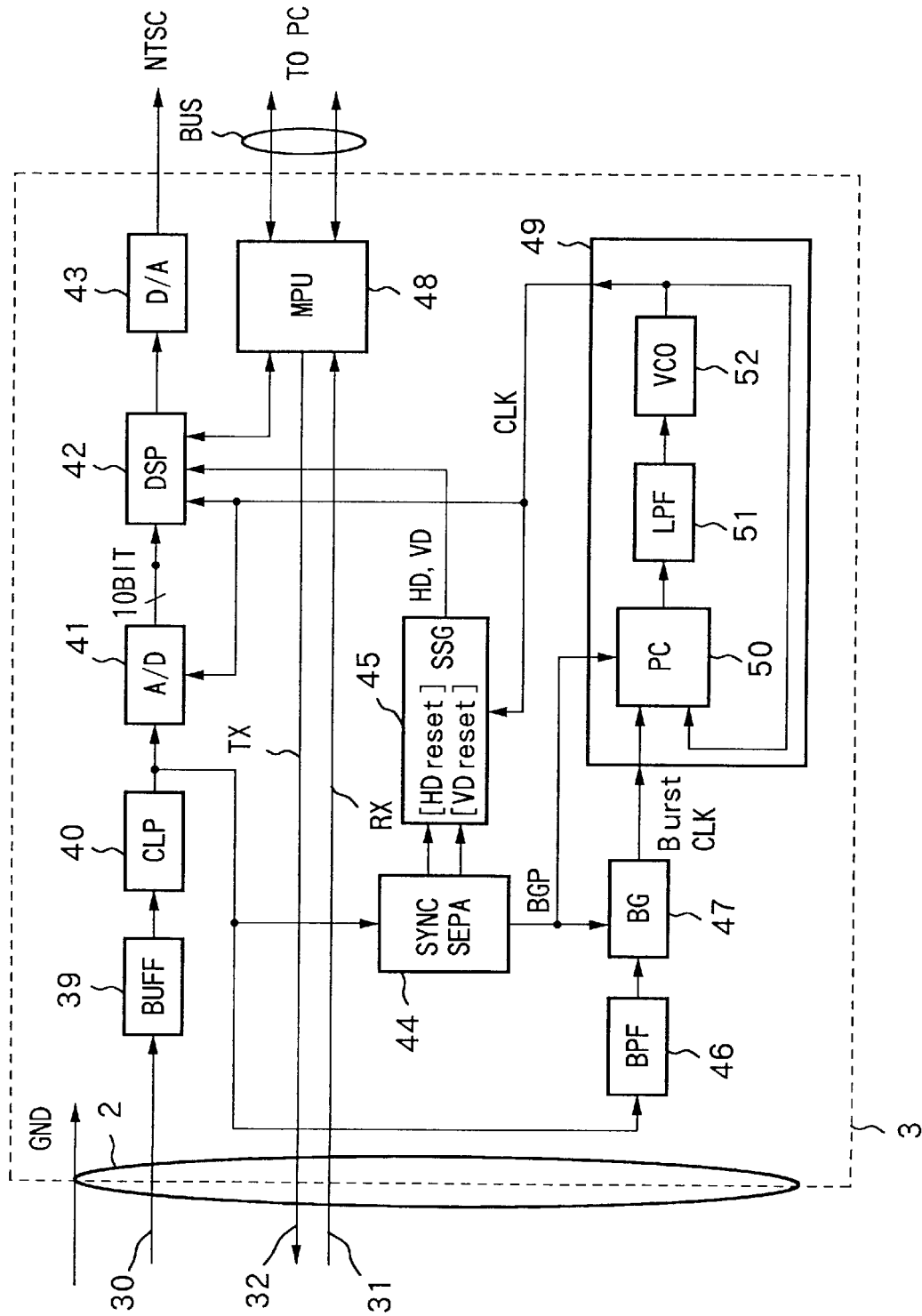
FIG. 31 shows an image processing section of a conventional head-separated camera.
Figure 32:
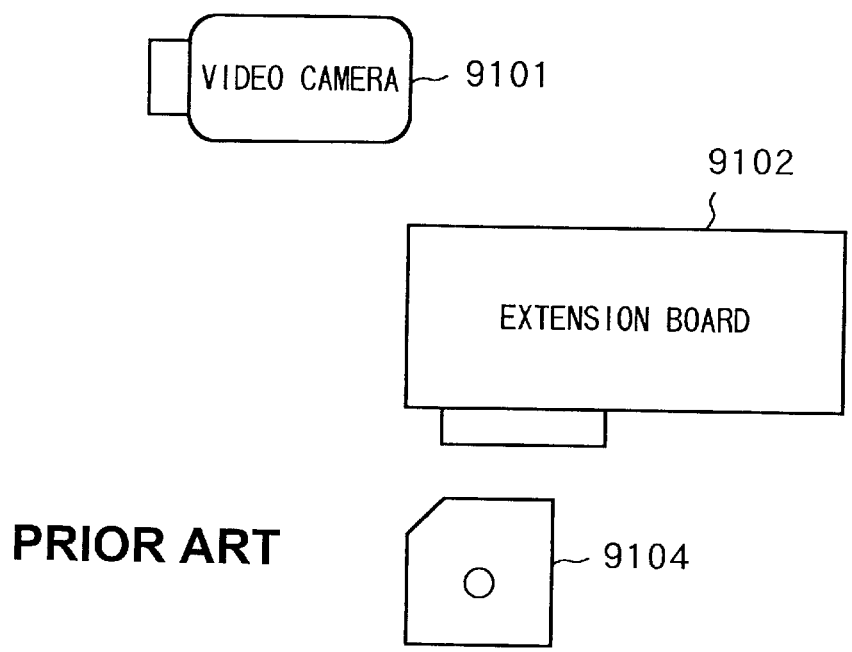
FIG. 32 is a configuration diagram showing an image pickup system in a conventional television conference system.
Figure 33:
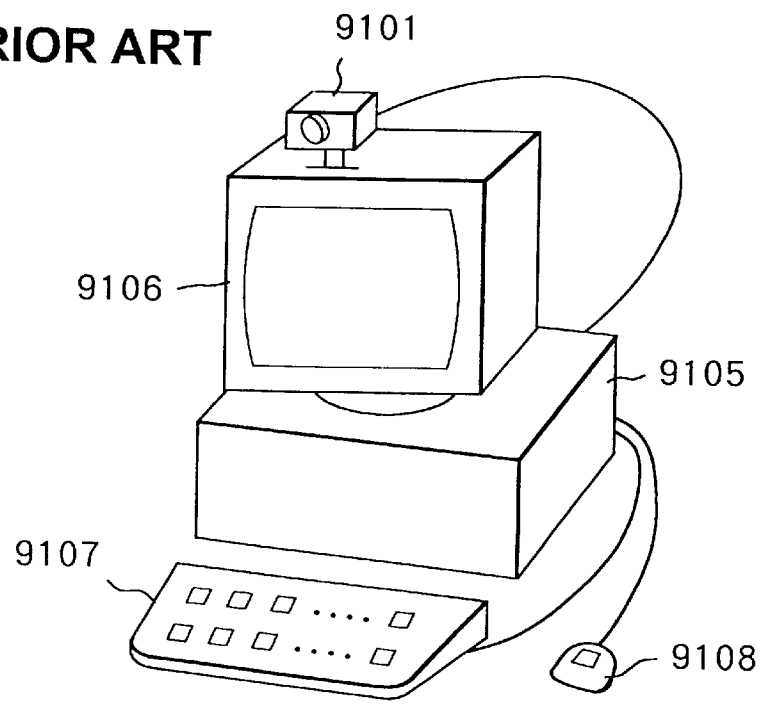
FIG. 33 is an outline drawing of a conventional image pickup system.
Figure 34:
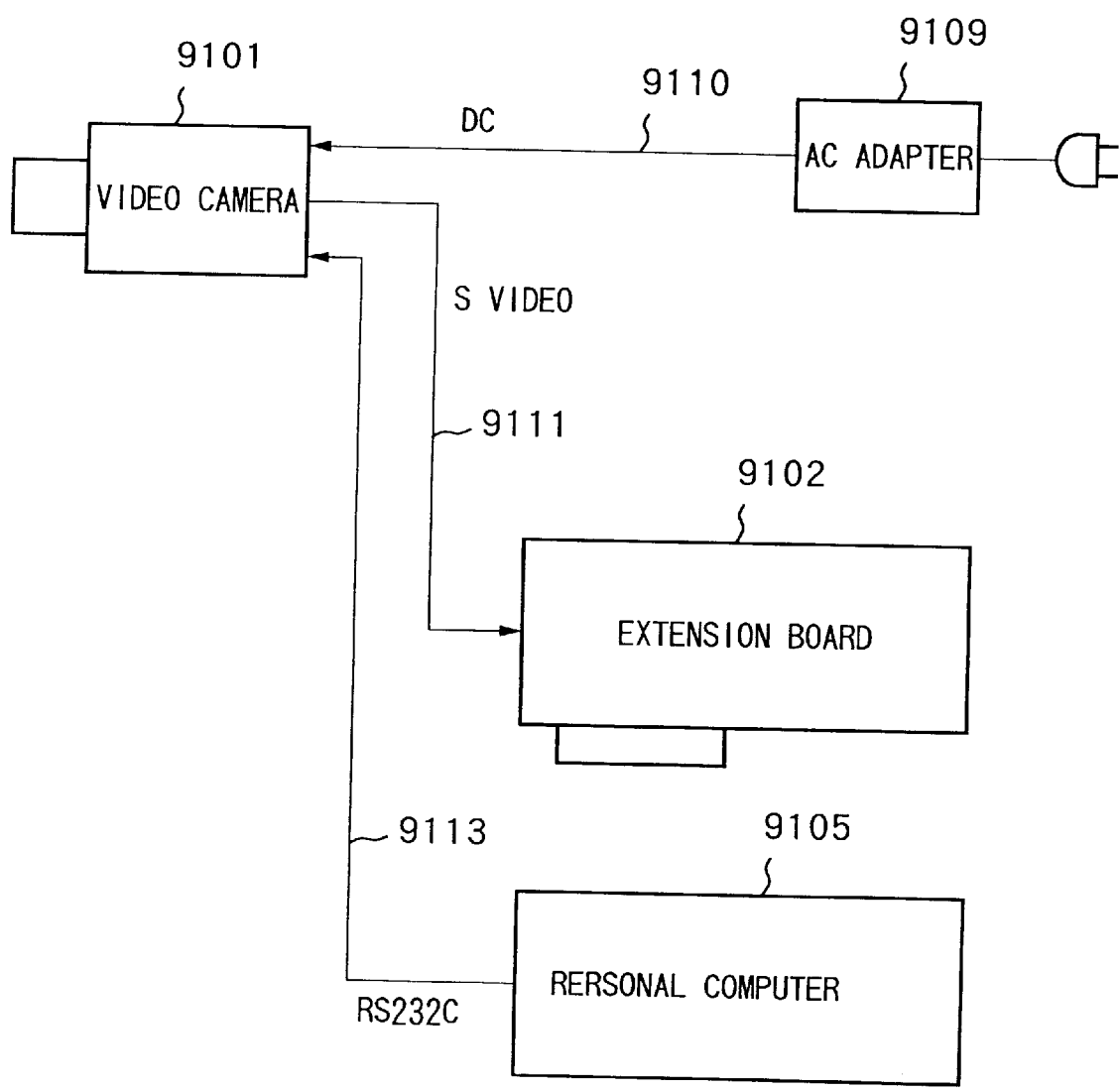
FIG. 34 is a block diagram of a conventional image pickup system.

The clock generating section 1100 has a switching device 165, two band pass filters (BPF160, BPF161), two burst gate circuits (BG162, BG163), a burst detection section (Detect) 164, and a PLL (Phase Locked Loop) circuit 170. The PLL circuit 170 includes a phase comparator (PC) 171, a lowpass filter 172, two voltage control oscillators (VCO 173, VCO174), and a switching device 175. A cable 102 connects a camera section 1 (FIG. 29) above mentioned to the image processing section 103. The camera section comprises the same structure as that in FIG. 29.

Reference numeral 130 denotes a terminal for inputting a video signal to which a clock and a composite synchronizing signal are added together; numeral 131 denotes a terminal for inputting a receive signal used to communicate with the camera section; and numeral 132 denotes a terminal for outputting a transmit signal used to communicate with the camera section. BUS indicates a bus used to bi-directionally communicate with the PC.

The first embodiment describes an example involving two clock frequencies of 9.5 MHz (corresponding to a CCD with 270,000 pixels) and 14.3 MHz (corresponding to a CCD with 410,000 pixels) wherein the BPF 160 (f=9.5 MHz), BPF 161 (f=14.3 MHz), VCO 173 (f=9.5 MHz center), and VCO 174 (f=14.3 MHz center) are used.

Next, the operation is described. A video signal that has passed through the buffer circuit 139 and clamp circuit 140 is input to the AD converter 141, synchronization separation circuit 144, and clock generating section 1100. The synchronization separation circuit 144 generates from the input video signal an HD signal, a VD signal, and a burst gate pulse (BGP). The HD and VD signals are input to reset terminals of a horizontal and a vertical synchronization counters (not shown) in the synchronizing signal generator 145 to provide horizontal and vertical synchronization with the camera section 1. The HD and VD signals in synchronism with the camera section 1 are further input to the DSP circuit 142. Based on the video signal input to the clock generating section 1100, the band pass filters 160 and 161 and the PLL circuit 170 that are suitable for a burst clock frequency generate a clock (CLK) with a matching phase. The configuration of the clock generating section 1100 is described below. The clock (CLK) generated by the clock generating section 1100 is input to the synchronizing signal generator 145, AD converter 141, and DSP circuit 142. The video signal, which has been input to the AD converter 141, is converted into a digital one, image-processed by the DSP circuit 142 in synchronism with the clock (CLK) from the clock generating section 1100 and the synchronizing signals (HD, VD) from the synchronizing signal generator 145, and then converted into an analog video signal (for example, an NTSC signal) by the DA converter 143 for output. The MPU 148 executes bi-directional communication via the PC and bus and uses the output terminal 132 and input terminal 131 to communicate with the MPU 20 in the camera section 1 in order to drive the zoom and auto-focus lenses of the camera section 1 and to control the iris and AGC.

FIG. 2 describes waveforms from each section such as the clock generating section 1100. The operation of the clock generating section 1100 is described with reference to FIGS. 1 and 2. After a video signal (a signal 180) has been input to the two band pass filters (BPF) 160 and 161, almost all of the synchronizing signal and video signal are attenuated to output only the frequency component in the passing region. When the burst clock has a frequency of, for example, 9.5 MHz as shown in FIG. 2, only the burst clock component free of the synchronizing signal and video signal is output from the BPF 160 whereas almost nothing is output from the BPF 161. On the contrary, when the burst clock has a frequency of 14.3 MHz, only the burst clock component free of the synchronizing signal and video signal is output from the BPF 161 whereas almost nothing is output from the BPF 160. Outputs (signals 181 and 182) from the BPFs 160 and 161 are input to the BGs 162 and 163, respectively, where based on a signal BGP generated by the synchronization separation circuit 144, noise components remaining in the video signal region are removed and output (signals 183 and 184). In addition, the outputs (the signals 183 and 184) from the BGs 162 and 163 are input to the burst detection section 164 to determine whether or not there is a burst pulse. The result is output to the MPU 148. The MPU 148 outputs a switching signal 185 to switch between the BPFs 160 and 161 and the VCOs 173 and 174 based on the result.

Next, the PLL circuit 170 is described. One of the signals 183 and 184 gated by the signal BGP which has a burst clock is selected by the switching device 165 using a switching signal 185 generated by the MPU 148, and is then input to the phase comparator (PC) 171. The PC 171 compares the phases of the burst clock 186 and the clock (CLK=outputs from the VCO) 187 in the area in which the burst clock is present in order to output a differential signal 188 between them. The signal 188 is input to the lowpass filter (LPF) 172. The LPF 172 averages the signal 188 from the PC 171 to output a signal 189. The signal 189 is input to the two VCOs 173 and 174. The VCO 173 has a center frequency of 9.5 MHz and the VCO 174 has a center frequency of 14.3 MHz. Each VCO varies an oscillation frequency depending on the level of the signal 189. Ace One of the outputs from the VCOs 173, 174 which corresponds to the frequency of the burst clock is selected by the switching device 175 using the switching signal 185, and is then fed back to the PC 171, as the CLK. In this manner, when the phases of the burst clock and the clock (CLK) match, the phase is locked.

FIGS. 3A and 3B show an example of a configuration of the burst detection section 164 and an example of its detection method, respectively. The signals 183 and 184 output from the BGs 162 and 163 pass through detection circuits 281 and 282, which detect the peaks of the signals (signals 190 and 191), respectively. Each of the signals 190, 191 is then input to each of comparators 283 and 284, respectively. The comparators 283 and 284 binarize the signals 190 and 191 (signals 192 and 193) and sampling circuits 285, 286 sample them using a timing signal 194 generated from the signal BGP, respectively. The results sampled in the sampling circuits 285, 286 are transmitted to the MPU 148, which determines whether or not there is a burst clock in the signals to determine the frequency of the burst clock. Based on this, the MPU 148 generates the switching signal 185 that selects one of the BPFs 160 and 161 and one of the VCOs 173 and 174 corresponding to the detected frequency of the burst clock.

In FIGS. 3A and 3B, the comparing and sampling function of the burst detection section 164 may be not only to implement a logic circuit but also to execute processing using an A/D port of the MPU 148. Furthermore, not only the switching signal 185 is output from the MPU 148 as in the first embodiment but the logic circuit can also implement all the operation starting with the detection of a burst and ending with the output of the switching signal. In addition, although the first embodiment includes the detection circuit 164 for automatically detecting the frequency of a burst signal sent from the camera section 1, for example, a memory such as a ROM that stores data on the number of pixels or the frequency of a burst may be provided in the camera section 1 so that this data is automatically transmitted when the camera section 1 is connected to the image processing apparatus and so that the switches 165 and 175 are automatically switched based on the transmitted data.

Figure 4:
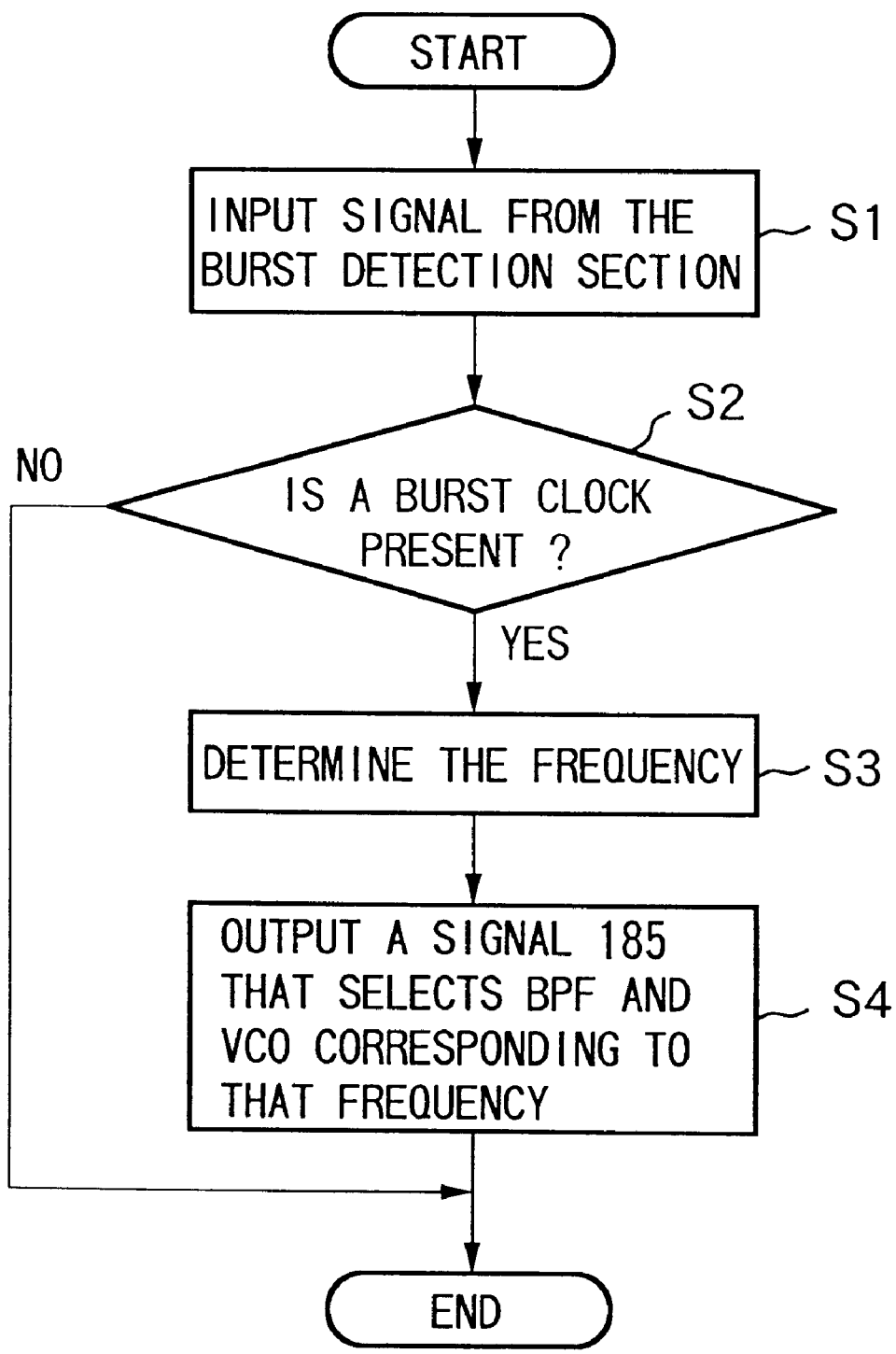
FIG. 4 is a flowchart showing processing by an MPU according to the first embodiment.

FIG. 4 is a flowchart showing processing by the MPU 148 according to the first embodiment.

First, in step S1, a signal indicating the result of detection by the burst detection section 164, is received, and the process then proceeds to step S2, it is determined whether or not a burst clock has been detected in a video signal from the camera section 1. If so, the process advances to step S3 to determine the frequency of the burst clock. In step S4, the MPU 148 outputs the signal 185 to select one of the BPFs 160, 161 and one of the VCOs 173, 174 corresponding to the frequency (in this case, 9.5 MHz (270,000 pixels) or in some cases, 14.3 MHz (410,000 pixels).

As described above, the first embodiment includes the band pass filters (BPFs) and VCOs corresponding to a plurality of frequencies of a burst signal to switch them depending on an input video signal, thereby enabling a camera section to be replaced and also enabling automatic optimization without a special adjustment operation.

Second Embodiment

Figure 5:
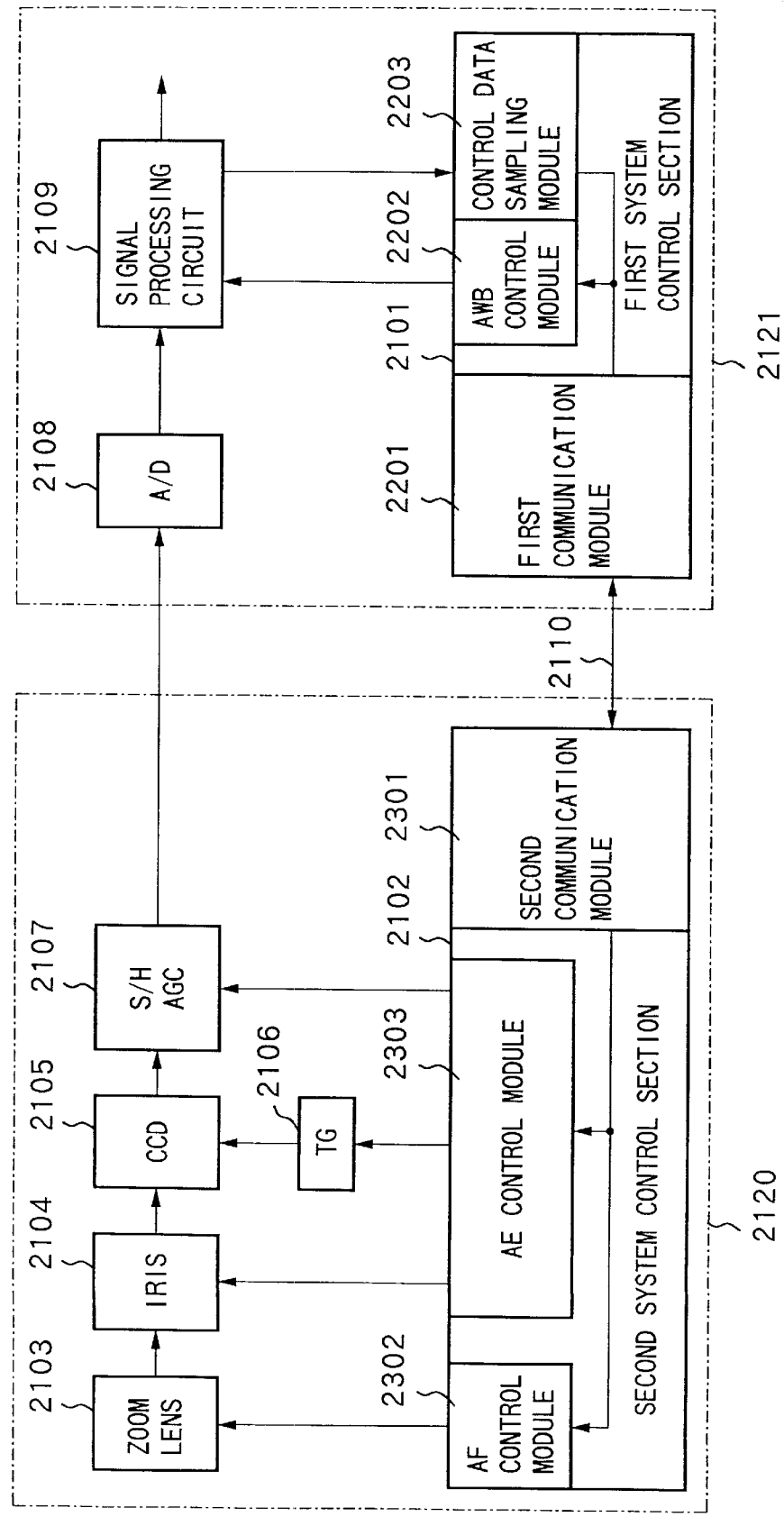
FIG. 5 is a block diagram showing a configuration of an image pickup apparatus according to a second embodiment.

FIG. 5 is a block diagram showing a configuration of a second embodiment according to this invention. This figure shows a separated zoom camera in which an image pickup section (a camera section) can be separated from the body.

In FIG. 5, numeral 2120 denotes a camera section having an image pickup section that is separated from a body; numeral 2121 denotes a camera signal processing section in the body for processing a signal from the camera section 2120; numeral 2101 denotes a first system control section for controlling the camera signal processing section 2121; numeral 2102 denotes a second system control section for controlling each portion of the camera section 2120; numeral 2103 denotes an optical lens system including a zoom lens, a zoom motor that drives the zoom lens, a focus lens, and a focus motor that drives the focus lens; numeral 2104 denotes an iris that adjusts the amount of incident light passing through the optical lens system 2103; numeral 2105 denotes a CCD that is an image pickup element; and numeral 2106 denotes a TG for controlling the CCD 2105.

Reference numeral 2107 denotes an S/H&AGC circuit for performing a sampling and holding operation to reduce noise from stored charges in the CCD 2106 and adjusting the gain of an image pickup signal; numeral 2108 denotes an A/D converter for converting an analog signal from the S/H&AGC circuit 2107 into a digital signal; numeral 2109 denotes a signal processing circuit for executing required signal processing to convert a digital signal from the A/D converter 2108 into a video signal to output various information required to control auto-focus (AF), auto-exposure (AE), and auto-white-balance (AWB).

Reference numeral 2110 denotes a signal line used to communicate between the first system control section 2101 and the second system control section 2102 and connected between a first communication module 2201 in the first system control section 2101 and a second communication module 2301 in the second system control section 2102. Control information used to control the camera section 2120 which has been obtained by the first system control section 2101 is transmitted to the second system control section 2102 through the signal line 2110 to allow the system control sections 2101 and 2102 to provide their respective required control.

The first system control section 2101 includes a control data sampling module 2203 and an AWB control module 2202 as well as the first communication module 2201, and the second system control section 2102 includes an AF control module 2302 and an AE control module 2303 as well as the second communication module 2301.

The operation of the second embodiment is described by focusing on the first and second system control sections 2101 and 2102. The first system control section 2101 obtains information on white balance, focus, and signal level (wide area components of a signal, color information, and the average of signal levels) via the control data sampling module 2101 from the signal processing circuit 2109 and passes it to the AWB control module 2202 and first communication module 2201 in the first system control section 2101.

The information passed to the first communication module 2201 is passed through the signal line 2110 to the second communication module 2301 in the second system control section 2102, and the information on focus and signal level that is required for processing the AF and AE control modules 2302 and 2303 is then passed to these modules.

This information is processed by each module and the AF control module 2302 controls the focus motor in the optical lens system 2103 while the AE module 2303 controls the AE by controlling the iris motor in the iris 2104, controlling the TG 2106 so as to control the time required by the CCD 2105 to store charges, and controlling the S/H&AGC circuit 2107. In addition, a signal from the S/H&AGC circuit 2107 is converted into a digital signal by the A/D converter 2108 and then sent to the signal processing circuit 2109 to allow the system control section 2101 to again obtain information on white balance, focus, and signal level.

In this manner, the information used to control the camera which has been sampled from the signal processing circuit 2109 by the first system control section 2101 in the camera signal processing section 2121 is communicated to the second system control section 2102 in the camera section 2120 so that the first system control section 2101 can provide control required by the signal processing circuit 2109 while the second system control section 2102 can provide control required by the camera section 2120. Thus, the camera section 2120 can be replaced without changing the camera signal processing section 2121, thereby reducing the cost of the entire system. In addition, since the signal processing section 2121 need not be changed even if the specification of the camera section 2120 is to be altered, only the camera section 2120 can be developed, thereby reducing the time required to develop an image pickup system including such a camera section.

Figure 6:
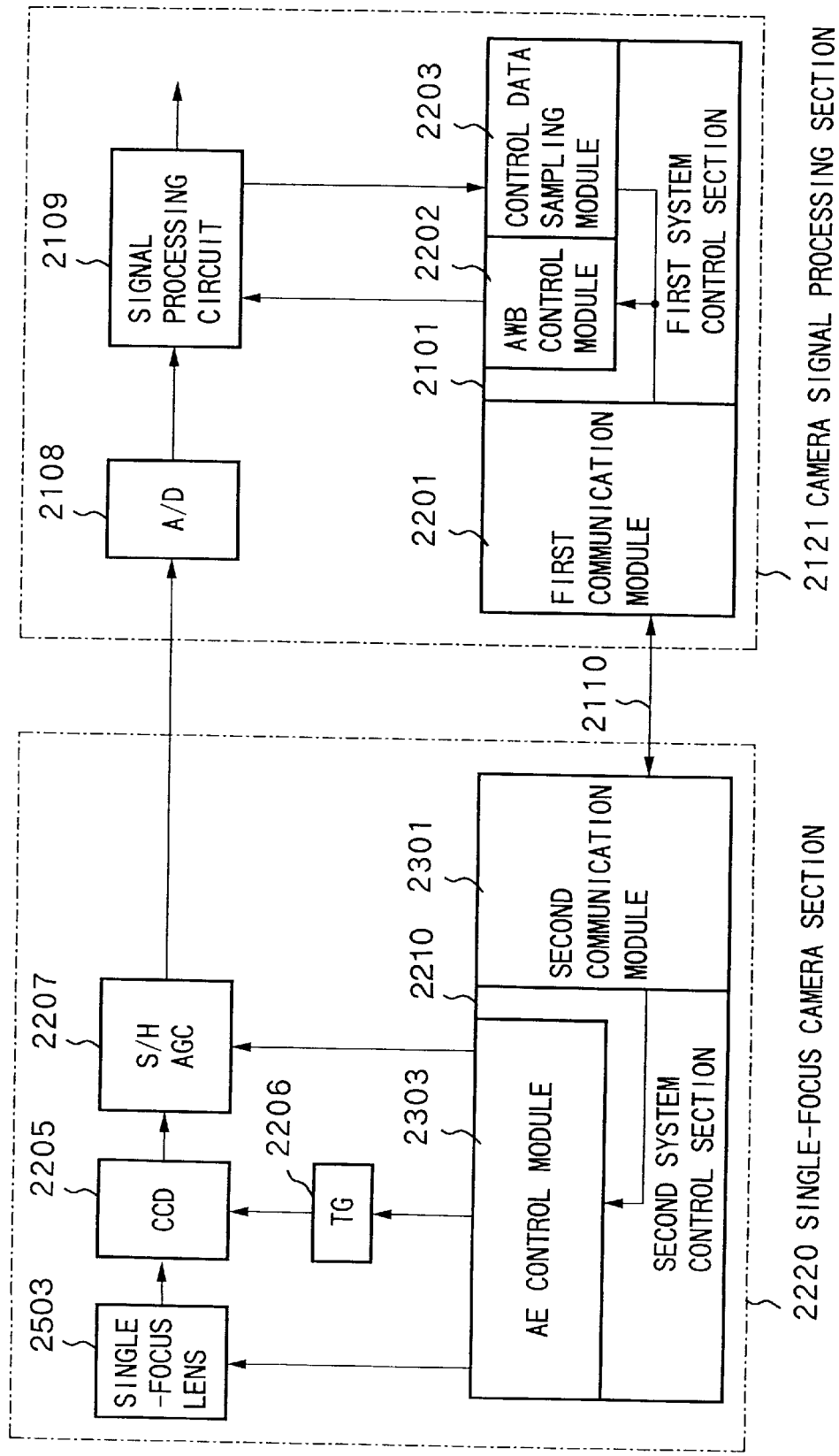
FIG. 6 is a block diagram showing a configuration of an image pickup apparatus according to a third embodiment.

FIG. 6 is a block diagram showing a configuration according to a third embodiment of this invention. The third embodiment is a block diagram showing an example of a single-focus camera section 2220 constituted by changing the zoom lens 2103 of the camera section 2120 in FIG. 5 to a single-focus lens 2503. The camera signal processing section 2121 is the same as described in FIG. 5.

In FIG. 6, numeral 2210 denotes a second system control section for controlling the camera section 2220; numeral 2503 denotes a single-focus lens; numeral 2205 denotes a CCD that is an image pickup element; numeral 2206 denotes a TG that controls the CCD 2205; numeral 2207 denotes an S/H&AGC circuit for performing a sampling and holding operation to reduce noise from charges stored in the CCD 2205 and adjusting the gain of an image pickup signal.

Since the third embodiment has no focus or iris mechanism in the camera section 2220, the second system control section 2202 receives only information on AE from the first system control section 2101 in the camera signal processing section 2121 via a second communication module 2301 in order to control the TG 2206 and S/H&AGC circuit 2207 via the AE control module 2303.

In this configuration, information used to control the camera which has been sampled from the signal processing circuit 2109 by the first system control section 2101 can be communicated to the second system control section 2202 for replacing to allow the system control sections 2101 and 2202 to provide their respective required control. Consequently, effects similar to those of the second embodiment in FIG. 5 can be obtained.

Fourth Embodiment

Figure 7:
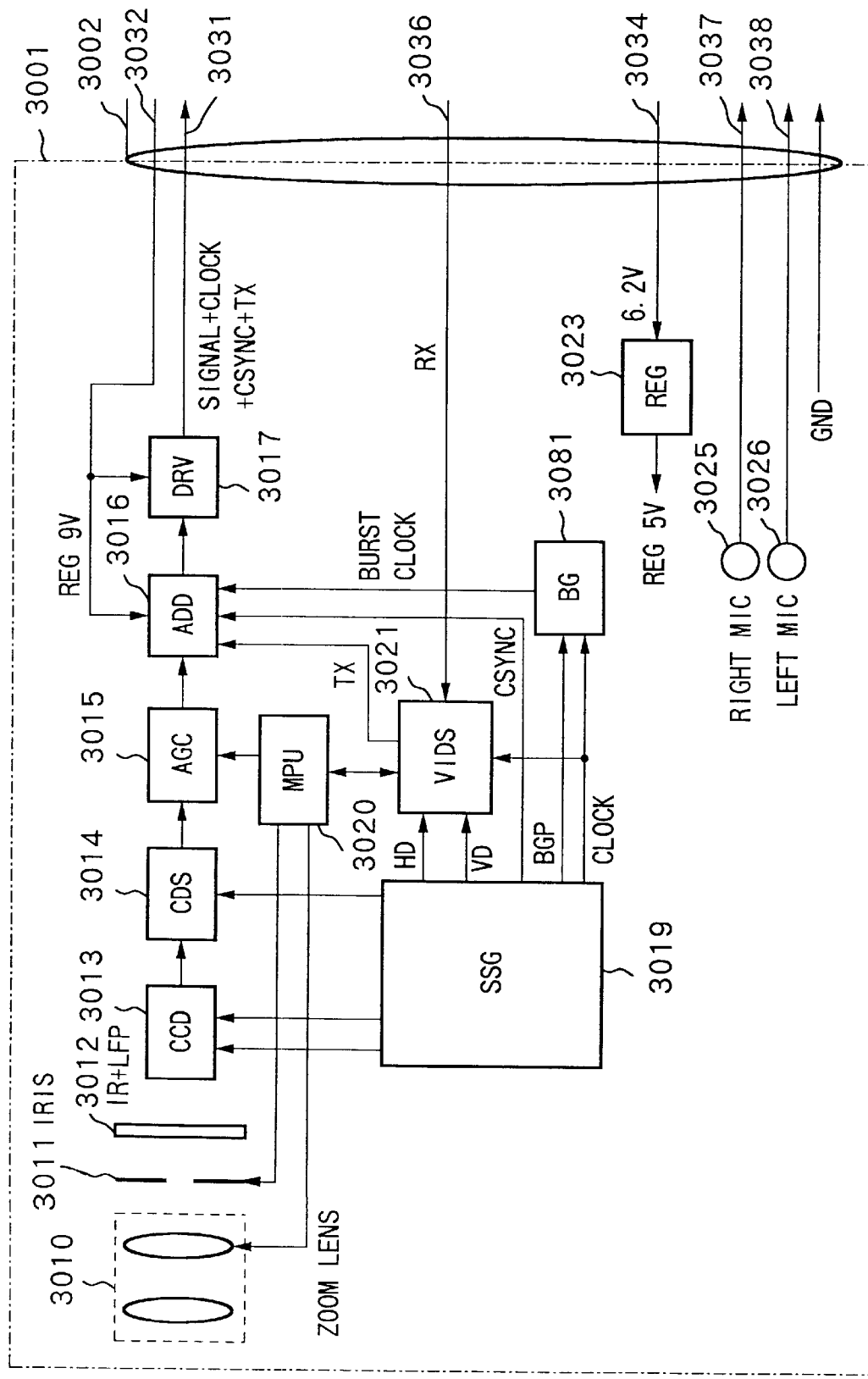
FIG. 7 is a block diagram showing a configuration of a camera section according to a fourth embodiment of this invention.

FIG. 7 is a block diagram showing a configuration of a camera section according to a fourth embodiment of this invention.

In this figure, a camera section 3001 comprises a zoom lens 3010; an iris 3011; an optical lowpass filter and infrared cut filter 3012; a CCD 3013; a CDS circuit 3014; an AGC control circuit 3015; an addition circuit 3016 for adding a CCD signal to controlling transmit data TX; a drive circuit 3017 for driving a 75-Ω coaxial line; a synchronizing signal generator (SSG) 3819; an MPU 3020; a processing circuit 3021 for transmitting control data during a video signal synchronization interval (hereafter referred to as a "VIDS (Vertical Interval Data Signal)); a series regulator REG 3023 that serves to change a 6.2-V power supply to a 5-V one with reduced noise; a right stereo microphone 3025; and a left stereo microphone 3026.

Reference numeral 3031 denotes an output terminal for transmitting to an image processing section 3003 a video signal to which a composite synchronizing signal, a clock, and controlling transmit data are added, and numeral 3036 denotes a terminal for inputting controlling receive data from the image processing section 3003, and numeral 3034 denotes an input terminal of an irregulate power supply input (in this. case, 6.2 V) that regulates a first analog power supply (in this case, 5 V). Reference numeral 3032 denotes an input terminal of a second analog power supply (in this case, 9 V), numeral 3037 denotes a right audio signal output terminal of the stereo microphone, and numeral 3038 denotes a left audio signal output terminal of the stereo microphone.

A cable 3002 connects the camera section 3001 to the image processing section 3003.

The operation is described. An image is focused to the CCD 3013 via the zoom lens 3010, iris 3011, optical lowpass filter and infrared cut filter 3012. The image pickup signal from the CCD 3013 is supplied to the CDS circuit 3014 and then to the AGC control circuit 3015. The synchronizing signal generator (SSG) 3019 outputs various synchronizing pulses and a composite synchronizing signal (HD and VD) used for CCD photographing, a burst gate pulse (BGP), and a pixel clock (CLOCK) for a predetermined period of time that is used as a reference for photographing. Based on a BGP from the synchronizing signal generator 3019, a burst gate (BG) circuit 3081 provides gating so that the input clock (CLOCK) is changed to a burst clock suitable for addition to the video signal. The VIDS circuit 3021 receives controlling receive data (RX) from the image processing section 3003 (described in FIG. 8), which has received this data through the input terminal 3036. The VIDS circuit 3021 then transmits the receive data to the MPU 3020. The MPU 3020 inputs to the VIDS circuit 3021 controlling transmit data to be transmitted to the image processing section 3003 (FIG. 8), and the VIDS circuit 3021 outputs this data to the addition circuit 3016. Such communication via the VIDS 3021 is all executed in synchronism with the horizontal and vertical synchronizing signals (HD and VD) and clock (CLOCK) from the synchronizing signal generator 3019. In the communication via the VIDS 3021, data are superposed on one another during a vertical interval.

The addition circuit 3016 adds together a video signal output from the AGC control circuit 3015, controlling transmit data from the VIDS circuit 3021, a burst clock from the BG circuit 3081, and a composite synchronizing signal from the synchronizing signal generator 3019. After addition, the video signal is driven by the 75-Ω drive circuit 3017 and output to the image processing section 3003 from the output terminal 3031. The MPU 3020 that controls the entire camera section 3001 communicates with the image processing section 3003 via the VIDS circuit 3021, and based on this communication, controls the magnification of the zoom lens 3010, an auto-focus lens (not shown), the value of the iris 3011, and the gain of the AGC control circuit 3015.

Figure 8:
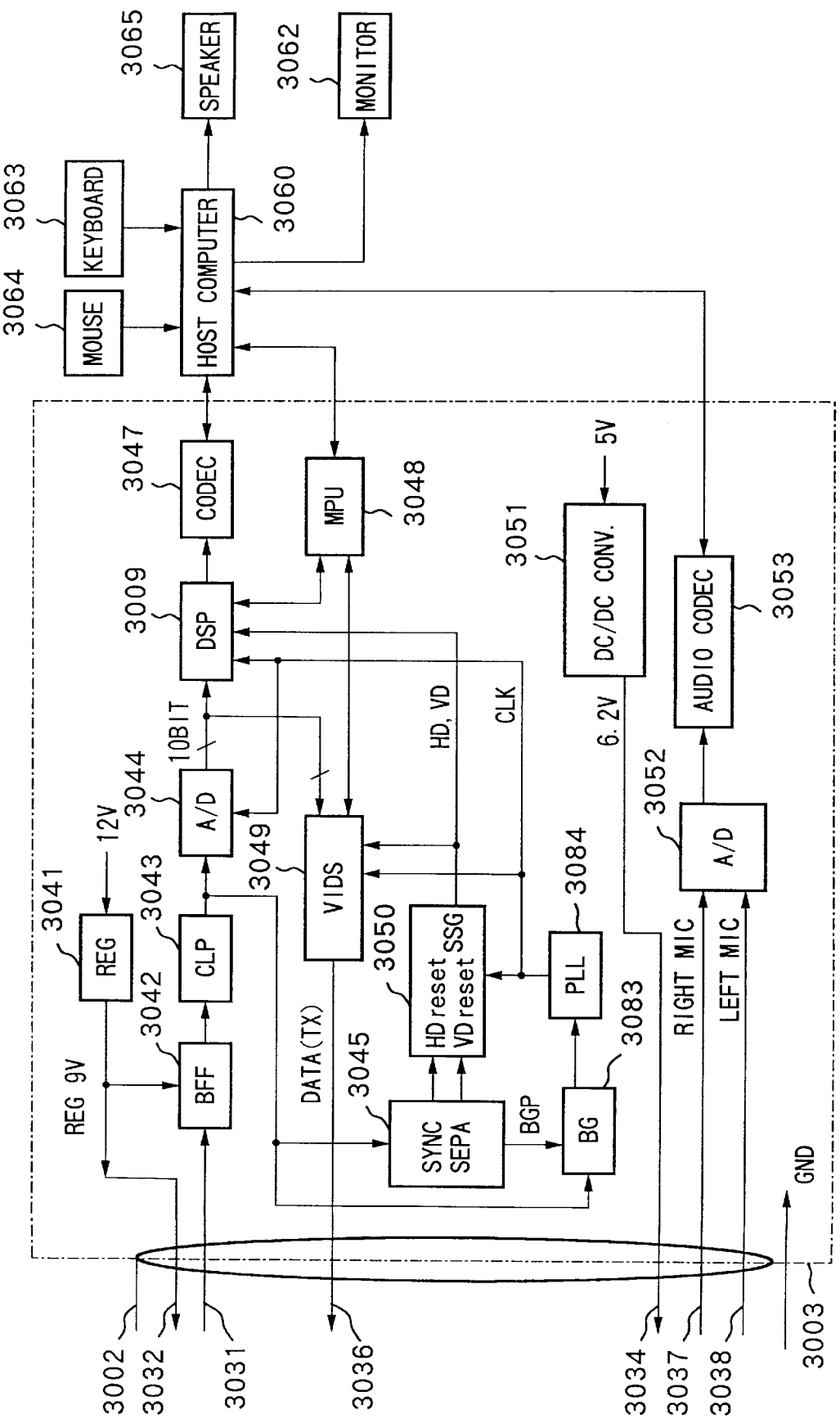
FIG. 8 is a block diagram showing a configuration of a host computer section including an image processing section according to the fourth embodiment of this invention.

FIG. 8 shows a configuration of the image processing section 3003 that is the fourth embodiment of this invention and that is made for an extension board or card (a PCM card) and a host computer having an extension slot into which the image processing section is inserted. The image processing circuit 3003 comprises a buffer circuit 3042 for a video signal 3031; a clamp circuit 3043; an AD converter 3044; a digital signal processing (DSP) circuit 3009 for executing digital signal processing such as filtering, color separation, gamma correction, matrix operation, or clipping required for color photographing; an image encoder/decoder (CODEC) 3047 that converts image data into a format used for television conference; an MPU 3048; a VIDS circuit 3049 for transmitting and receiving control data during a video signal vertical interval; a synchronization separation circuit 3045; a synchronizing signal generator 3050; a burst gate (BG) circuit 3083; and a PLL (Phase Locked Loop) circuit 3084.

Reference numeral 3031 denotes a terminal for inputting a video signal to which a composite synchronizing signal, a clock (CLOCK), and controlling receive data are added, and numeral 3036 denotes a terminal for outputting controlling transmit data to the camera section 3001. Reference numeral 3034 denotes the output terminal of the irregulate power supply (in this case, 6.2 V) for the first analog power supply (in this case, 5 V) required by the camera section 3001. Reference numeral 3032 denotes an output terminal of the second analog power supply (in this case, 9 V) required by the camera section 3001, numeral 3037 denotes a right audio signal input terminal of the stereo microphone, and numeral 3038 denotes a left audio signal input terminal of the stereo microphone. The cable 3002 connects the camera section 3001 to the image processing section 3003.

The operation is described. A video signal from the camera section 3001, which has been input from the input terminal 3031, is input to the BG circuit 3083, synchronization separation circuit 3045, and AD converter 3044 via the buffer circuit 3042 and clamp circuit 3043.

The synchronization separation circuit 3045 generates from the input video signal an HD signal, a VD signal, and a burst gate pulse (BGP). The HD and VD signals are input to reset terminals of a horizontal and a vertical synchronization counters (not shown) in the synchronizing signal generator 3050 to provide horizontal and vertical synchronization with the camera section 3001. The HD and VD signals in synchronism with the camera section 3001 are input to the DSP circuit 3009 and VIDS circuit 3049.

Based on a signal BGP generated by the synchronization separation circuit 3045, only the burst clock, which has been added to the video signal input to the BG circuit 3083, is extracted from the video signal and then input to the PLL circuit 3084. The PLL circuit 3084 generates a clock (CLK) from the burst clock and inputs it to the synchronizing signal generator 3050, AD converter 3044, DSP circuit 3009, and VIDS circuit 3049.

The video signal input to the AD converter 3044 is converted into a digital signal in synchronism with the clock (CLK) from the PLL circuit 3084 and then input to the input to the DSP circuit 3009 and VIDS circuit 3049.

The digital signal input to the DSP circuit 3009 is subjected to digital signal processing such as filtering, color separation, gamma correction, matrix operation, or clipping required for color photographing, in synchronism with a clock from the PLL circuit 3084 and a synchronizing signal from the synchronizing signal generator 3050. The signal is then converted by the image encoder/decoder (CODEC) 3047 into data in a format required for television conference and is output to the host computer 3060.

The VIDS circuit 3049 performs all operations in synchronism with the synchronizing signal from the synchronizing signal generator 3050 and the clock (CLK) from the PLL circuit 3084. The VIDS 3049 compares the input video digital signal to a reference digital value to detect controlling receive data from the camera section 3001 that has been multiplexed during the video signal vertical interval. This data is then transmitted to the MPU 3048. The VIDS circuit 3049 transmits control data for the camera section 3001 that has been received from the MPU 3048, to the VIDS circuit 3021 in the camera section 3001 during the vertical interval. The transmit data is directly transmitted from the output terminal 3036 through a cable without the multiplexion of other signals. This communication via the VIDS 3049 is advantageous in that the video signal is not affected by cross talk noise due to the exchange of data during the image vertical interval.

Figure 9:
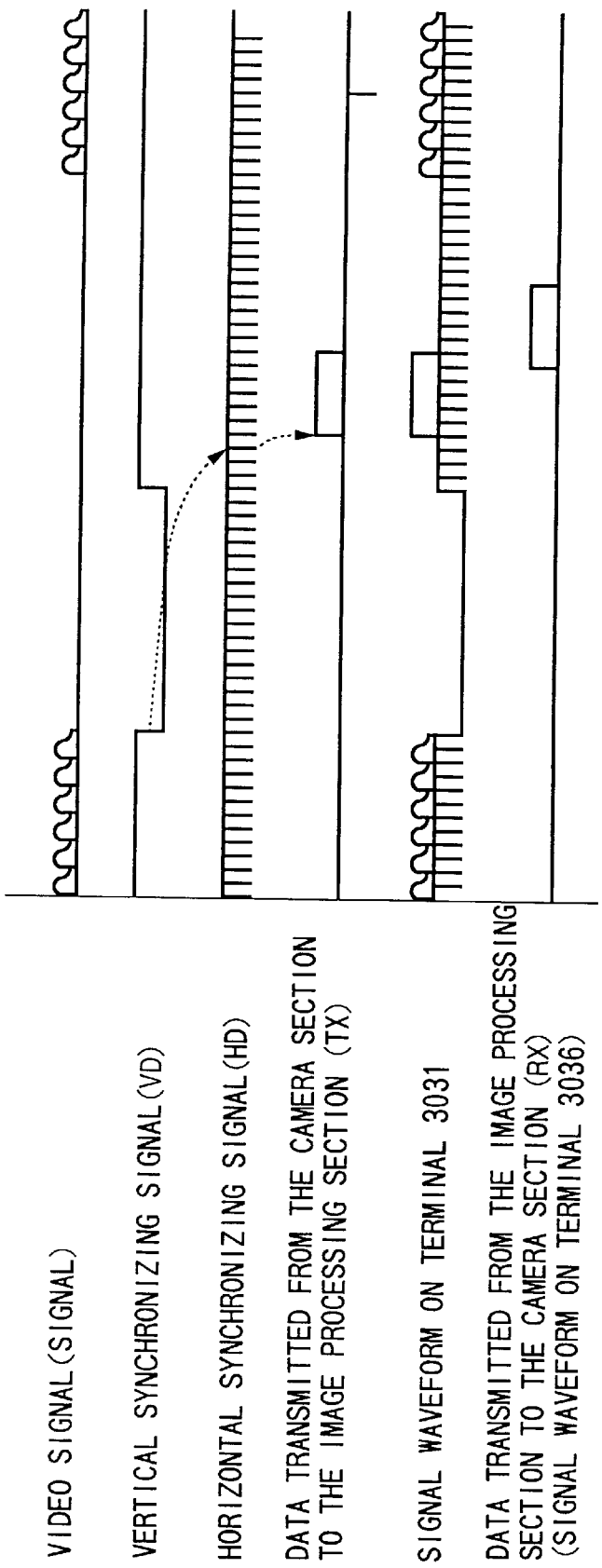
FIG. 9 shows an example in which data is added during a vertical interval according to the fourth embodiment.

FIG. 9 shows an example in which control data is added during the vertical interval. The camera section 3001 monitors the vertical and horizontal synchronizing signals to generate transmit data with an appropriate timing and to add it to a video signal so that the data is placed on a predetermined position. The image processing section 3003 similarly monitors the vertical and horizontal synchronizing signals to generate transmit data with an appropriate timing so that the data is placed on a predetermined position. The timing in the camera section 3001 is not necessarily the same as that in the image processing section 3003. As shown in the figure, transmit data to which a video signal and data are added is output from the camera section 3001 to the terminal, but the transmit data from the image processing section 3003 is solely sent using a single line.

A DC/DC converter 3051 increases the voltage (in this case, to 6.2 V) to supply power (in this case, 5V) for a first analog signal used by the camera section 3001 from noisy power (in this case, 5V) for the digital IC of the image processing section 3003. This power is supplied from the output terminal 3034.

A regulator 3041 is a power source for a second analog signal used by the camera section 3001 and directly supplies from the output terminal 3032, 9 V of power that has been obtained by regulating 12 V of power.

Stereo microphone inputs 3037 and 3038 are converted into digital signals by an AD converter 3052 and then converted by an audio CODEC 3053 into sound data required for television conference.

An image CODEC 3047, the audio CODEC 3053, and the MPU 3048 communicate data with the host computer 3060. A keyboard 3063, a mouse 3064, a speaker 3065, and a monitor 3062 are connected to the host computer 3060.

Next, a composite cable connecting the camera section 3001 to the image processing section 3003 and a signal passing through 8-pin DIN connectors at both ends of the cable are described.

A first pin provides a signal 3031 comprising a CCD signal on which a VIDS signal is superposed.

A second pin provides a 9-V power supply 3032. A third pin provides a CLK signal.

A fourth pin provides a 6.2-V power supply 3034. A fifth pin provides an SYNC signal.

A sixth pin provides a VIDS signal 3036 transmitted from the image processing section 3003 to the camera section 3001.

A seventh pin provides the right side 3037 of an audio signal. An eighth pin provides the left side 3038 of the audio signal.

Although the fourth embodiment uses a composite synchronizing signal as a synchronizing signal transmitted from the camera section 3001 to the image processing section 3003, this signal may be a combination of a horizontal and a vertical synchronizing signals.

In addition, although the vertical blanking interval is used as a timing for communication between the camera section 3001 and the image processing section 3003, multiplexing may be provided anywhere as long as the video signal is not affected. For example, the effect of this communication can be obtained by, for example, multiplexing a signal on a horizontal synchronization signal interval.

Furthermore, although the fourth embodiment communicates data with a personal computer, it will be appreciated that a product configuration of a standalone video output type can be easily devised.

As described above, the fourth embodiment not only multiplexes the composite synchronizing signal, clock, and CCD signal on the signal transmitted from the camera section 3001 to the image processing section 3003 but also multiplexes the controlling transmit data on the vertical interval, and allows the image processing section 3003 to separate and identify this controlling data. This configuration enables one signal line for control data to be eliminated compared to the prior art.

Fifth Embodiment

Figure 10:
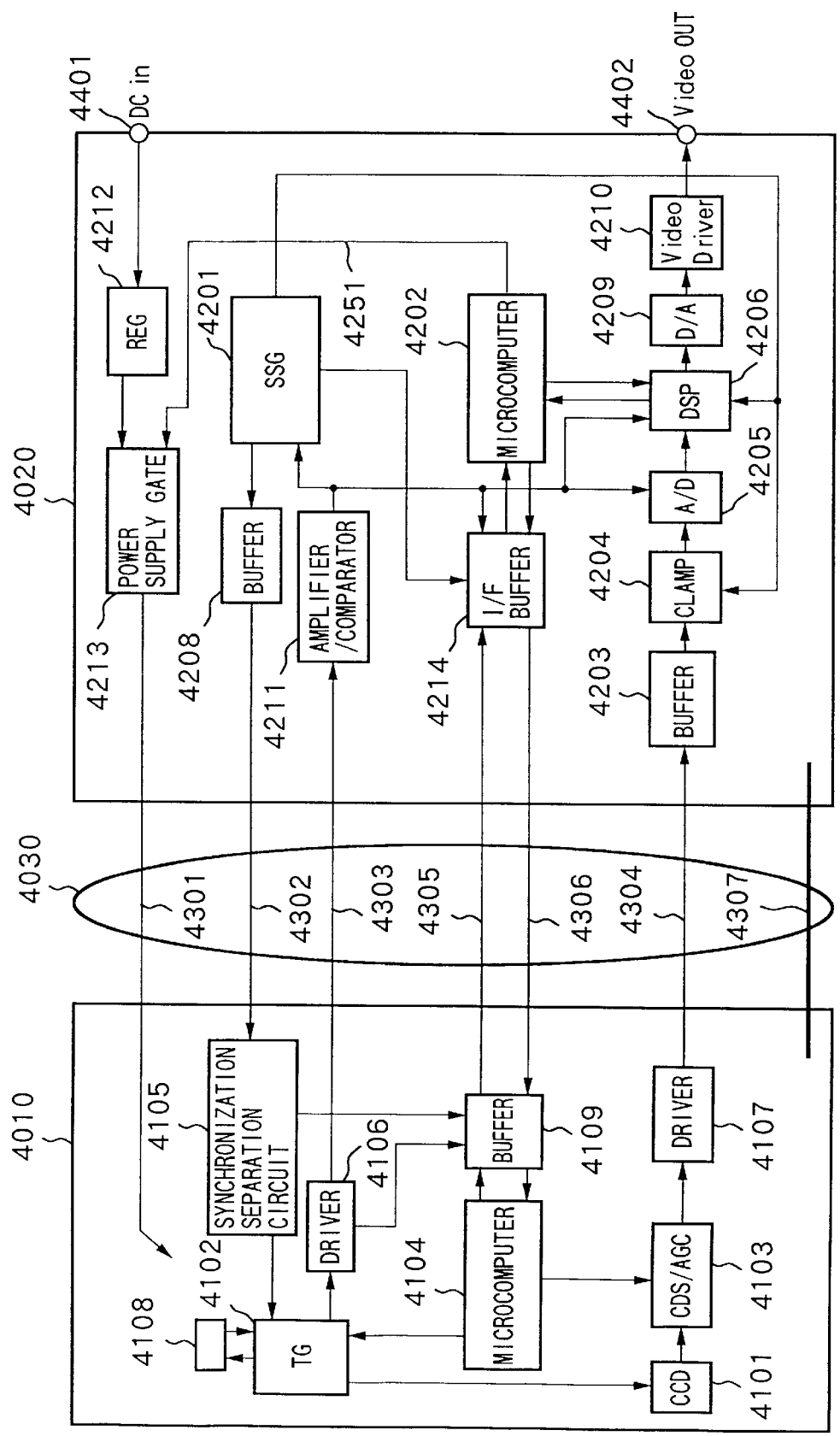
FIG. 10 is a block diagram showing a configuration of an image pickup apparatus according to a fifth embodiment of this invention.

FIG. 10 is a block diagram showing a configuration of a fifth embodiment.

In FIG. 10, numeral 4010 denotes an image pickup section, numeral 4020 denotes a signal processing section, and numeral 4030 denotes a cable connecting the image pickup section 4010 and the image processing section 4020 together.

First, the image pickup section 4020 is described. Reference numeral 4101 denotes a photoelectric converter means, for example, a CCD; numeral 4102 denotes a timing generator (TG) that synchronizes with a synchronizing signal, which is described below, based on a clock from an oscillation circuit, which is described below, in order to output a drive signal for the CCD 4101 and a clamp/sampling/blanking pulse for a CDS/AGC circuit, which is described below; numeral 4103 denotes a CDS/AGC circuit that uses a sampling pulse from the TG 4102 to clamp a horizontal black level portion of a signal that has been photoelectrically converted by the CCD 4101 in order to sample a photographed-video signal and a vertical and a horizontal black level portions, which are then amplified at a ratio determined by a control signal from a microcomputer 4104, which is described above, while using a blanking pulse from the TG 4102 to blank the portions other than the video or black level signal, which are then output; the microcomputer 4104 controls the image pickup section 4010; numeral 4105 denotes a synchronizing signal separation circuit that receives a synchronizing signal transmitted from the signal processing section 4020 to separate it into a horizontal and a vertical synchronizing signals, which are then output to the TG, while using the two synchronizing signals to output a transmit trigger signal, which is described below, to a buffer circuit 4109; numeral 4106 denotes a clock driver circuit for outputting a clock output from the TG 4102 to the buffer circuit 4109 and signal processing section 4020; numeral 4107 denotes a video signal driver circuit for outputting to the signal processing section 4020 a video signal output from the CDS/AGC circuit 4103; numeral 4108 denotes an oscillation circuit; and numeral 4109 denotes the buffer circuit for temporarily latching data transmitted from the microcomputer 4104 and a signal sent from the signal processing section 4020.

Next, a configuration of the signal processing section 4020 is explained. Reference numeral 4201 denotes an SSG circuit for generating a reference signal that is used by the signal processing section 4020 and image pickup section 4010, based on a clock transmitted from the image pickup section 4010; numeral 4202 denotes a microcomputer that controls the signal processing section 4020; numeral 4203 denotes a buffer circuit for receiving a video signal transmitted from the driver 4107 in the image pickup section 4010; numeral 4204 denotes a clamp circuit for using a sampling pulse from the SSG 4201 to clamp the output from the buffer circuit 4203 at a predetermined voltage; numeral 4205 denotes an A/D converter for using an output signal from an amplifier 4211 to execute the A/D conversion of an output signal from the clamp circuit 4204; numeral 4206 denotes a DSP (digital signal processor) circuit the mode of which is set by a signal from the microcomputer 4202 so as to process a signal from either a CCD with 270,000 pixels or a CCD with 410,000 pixels and which applies digital signal processing to output signal from the A/D conversion circuit 4205 using a signal output from the amplifier 4211; numeral 4209 denotes a D/A conversion circuit for executing the D/A conversion of an output signal from the DSP 4206; numeral 4210 denotes a video signal driver circuit for driving an output signal from the D/A conversion circuit 4209 to output it from an output terminal 4402, which is described below; numeral 4208 denotes a synchronizing signal driver circuit for outputting to the image pickup section 4010 a synchronizing signal output from the SSG 4201; numeral 4211 denotes an amplifying circuit for amplifying a clock signal output from the driver circuit 4106 in the image pickup section 4010 in order to output it to the SSG 4201, A/D conversion circuit 4205, DSP 4206, and buffer circuit 4214; numeral 4212 denotes a regulator that regulates a power supply input from a power supply input terminal 4401, which is described below; numeral 4213 denotes a power supply switch that controls a power supply transmitted to the image pickup section 4010 based on a control signal from the microcomputer 4202; and numeral 4214 denotes a buffer circuit for temporarily latching control data transmitted from the microcomputer 4202 to the image pickup section 4010 and data sent from the image pickup section 4010.

Next, signals (including a power supply line) passing through a cable 4030 connecting the image pickup section 4010 and the signal processing section 4020 together. Reference numeral 4301 denotes a line for supplying electric power from the signal processing section 4020 to the image pickup section 4010; numeral 4302 denotes a synchronizing signal transmitted from the signal processing section 4020 to the image pickup section 4010; numeral 4303 denotes a pixel clock signal transmitted from the image pickup section 4010 to the signal processing section 4020; numeral 4304 denotes a video signal transmitted from the image pickup section 4010 to the signal processing section 4020; numeral 4305 denotes a data signal transmitted from the image pickup section 4010 to the signal processing section 4020; numeral 4306 denotes a control signal transmitted from the signal processing section 4020 to the image pickup section 4010; and numeral 4307 denotes a ground that provides a common reference potential to the signal processing section 4020 and image pickup section 4010. In addition, numeral 4401 denotes a power input terminal to which a DC voltage is supplied from the outside, and numeral 4402 denotes a video signal output terminal for outputting a photographed-video signal to an external device (a PC tube).

Next, the operation will be described.

First, when input from the input terminal 4401, a DC voltage is supplied to the regulator 4212 to supply a predetermined voltage to the signal processing section 4020. On the supply of the DC voltage, the microcomputer 4202 is activated and performs an initializing operation. Once the initialization of the microcomputer 4202 has been completed, the microcomputer 4202 switches the power supply gate 4213 in order to supply power to the image pickup section 4010, by using a controller signal 4251. Once power has been supplied to the image pickup section 4010, the microcomputer 4104 in the image pickup section 4010 is activated and performs an initializing operation. In addition, the oscillation circuit 4108 starts oscillation to cause the TG 4102 to output a clock, which is supplied to the SSG 4201 via the driver 4106, the signal line 4303, and the amplifier 4211 in the signal processing section 4020. Based on the supplied clock, the SSG 4201 outputs synchronizing signals to supply a vertical synchronizing signal to the buffer 4214, a synchronizing signal to the image pickup section 4010 via the buffer 4208 and signal line 4302, and a horizontal and a vertical synchronizing signals to the TG 4102 via the synchronization separation circuit 4105, and a vertical synchronizing signal to the buffer 4109.

After initialization has been finished, the microcomputer 4104 in the image pickup section 4010 transmits an initial value of shutter speed (1/60 second) to the TG 4102 and an initial value of amplification rate (0 dB) to the CDS/AGC circuit 4103 in order to initialize the image pickup section 4010. The microcomputer 4014 also outputs an initializing completion command to the microcomputer 4202 in the signal processing section 4020 indicating that the initialization of the image pickup section 4010 has been completed, while generating unique data to the image pickup section 4010, namely, data on the characteristics of the CCD, the number of pixels of the CCD 4101, the presence of a zoom lens, and the characteristics of the zoom lens.

The unique data is temporarily stored in the buffer 4109. When a data end command is input from the microcomputer 4104, the stored data is sent to the signal processing section 4020 in synchronism with a clock from the driver 4106 based on the timing of a transmit trigger signal (a vertical synchronizing signal) output from the synchronization separation circuit 4105.

The buffer 4214 in the signal processing section 4020 latches and stores the transmitted signal based on a clock from the amplifier 4211, and outputs it to the microcomputer 4202 based on a vertical signal output from the SSG 4201. Based on this data, the microcomputer 4202 sets the SSG 4201 and DSP 4206.

Subsequently, the microcomputer 4202 in the signal processing section 4020 sends a signal to the microcomputer 4104 in the image pickup section 4010 indicating that the setting of the mode of the SSG and SP has been finished. The transmission procedure is he same as the data transmission procedure described below.

In addition, a signal that has been photo-electrically converted by the CCD 4101 is amplified by the CDS/ADC circuit 4103 and sent to the signal processing section 4020 via the driver circuit 4107. A video signal is transmitted via the signal line 4304 to the buffer 4203 and then sent to the clamp circuit 4204. The clamp circuit 4204 clamps the signal at a voltage (for example, a black level) predetermined by a clamp pulse output from the SSG 4201 and then outputs it. The output signal from the clamp circuit 4204 is input to the A/D conversion circuit 4205 and then sent to the DSP 4206. The DSP 4206 processes the digital signal using a mode set by the microcomputer 4202 in order to generate a video signal while detecting the average of the brightness of the video signal and the level of a high-frequency signal contained therein to transmit them to the microcomputer 4202. The microcomputer 4202 calculates the difference between the average of the brightness of the video signal sent from the DSP 4206 and a predetermined target value. It also records the level of the high-frequency component contained in the video signal while comparing it to the level of the high-frequency component of the preceding frame, to determine whether it has increased or decreased. Based on the result of the determination, it increases or reduces the signal level.

In addition, data obtained while the focus is moved closer is sent to the buffer 4214 and when the sending of the data has been finished, a data end signal is output to the buffer circuit 4214. On receiving the data end signal, the buffer circuit 4214 outputs the data to the buffer circuit 4109 in the image pickup section 4010 in synchronism with a transmit trigger signal output from the SSG 4201.

The timing with which this transmit data is output is described with reference to FIG. 11.

First, when one field of image data is input to the DSP 4206, the DSP 4206 determines the average of the brightness of the respective pixels in the one field of image data that has been input (in fact, one pixel of data is input, and each time a series of signal processing, for example, color processing such as (processing and white balance is finished, the value obtained is added to the preceding value. The sum is finally divided by the number of pixels). The data is then supplied from the DSP 4206 to the microcomputer 4202.

In addition, that signal in the video signal which has a frequency higher than a value specified in the DSP 4206 by the microcomputer 4202 is extracted to detect its signal level. This value is then output to the microcomputer 4202.

The DSP 4206 is capable of fast processing due to the use of hard logic for signal processing, but since it uses different processing steps for different data, the data are output with different timings. The microcomputer 4202 also uses different processing steps for different data, which are thus output with different timings. Furthermore, although not shown in the figure of the fifth embodiment, external operation instruction signals are input to the microcomputer 4202 in the signal processing section 4020, as well as mode setting finish signals for the SSG 4201 and DSP 4206, which have been omitted above. These signals are operation instructions for moving the zoom lens mounted in the image pickup section 4010 or drawing the section 4010 far away.

These data are output from the microcomputer 4202 to the buffer 4214 with different timings. The buffer 4214 latches the respective data signals and on receiving an output trigger signal output from the SSG 4201, sends them out to the buffer 4109 in the image pickup section 4010 via the signal line 4306 based on a clock signal output from an amplifier/comparator 4211.

Figure 11:
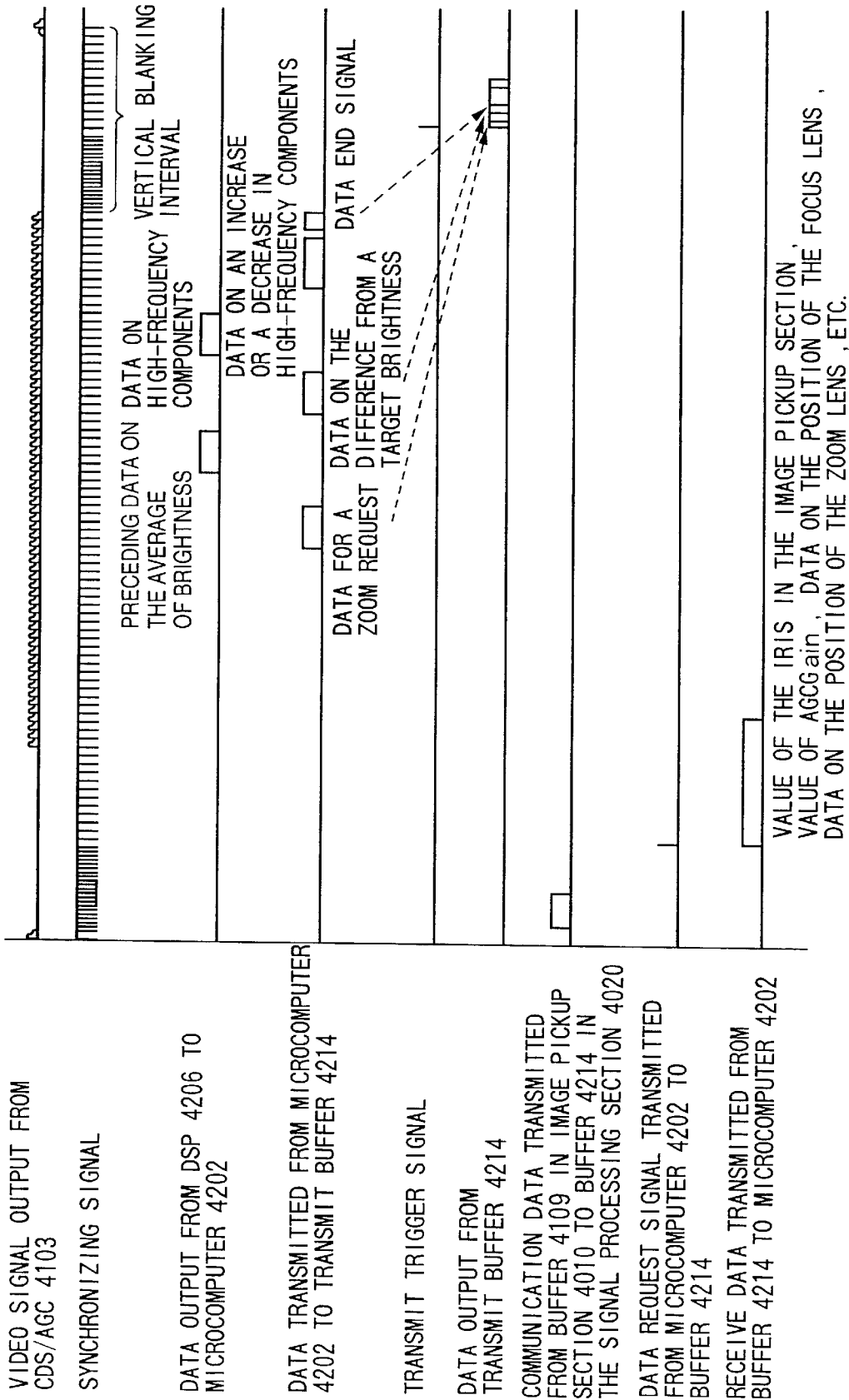
FIG. 11 is a timing chart describing the operation of the fifth embodiment.

FIG. 11 is a timing chart showing the exchange of control data between the image pickup section 4010 and the signal processing section 4020. This figure shows the relationship between the transmit data shown in the fifth embodiment and sent from the microcomputer 4202 in the signal processing section 4020 to the image pickup section 4010 and a signal output from the buffer 4214 to which various transmit data are transmitted from the microcomputer 4202 based on data that is input from the DSP 4206 and on which the above transmit data is based (an iris value, a signal amplification rate value, and lens position data are also output after the similar processing from the microcomputer 4104 in the image pickup section 4010 but are omitted).

As shown in the time chart shown in FIG. 11, the time period during which data is output from the buffer 4214 via the signal line 4306 is shorter than the time period during which data is output from the microcomputer 4202 to the buffer 4214 because the data I/O rate between the buffers 4214 and 4109 (about 4 Mbps) is higher than that of the microcomputer 4202 (about 0.4 Mbps).

The buffer circuit 4109 uses the same procedure as in the buffer circuit 4214 to send data out to the microcomputer 4104. The microcomputer 4104 corrects the photographing interval of the CCD 4101 (shutter speed) by the TG 4102 and the amplification rate of the CDS/AGC circuit 4103 based on the data on the difference between the transmitted brightness data and the data target value. In addition, although not shown, the focus lens, if any, is moved closer.

By using this procedure to concentrate in the vertical blanking interval the exchange of control signals between the image pickup section 4010 and the signal processing section 4020, control data can be communicated without mixing noise in the video signal which passes through the cable 4030 or horizontal synchronizing signal (in this description, it is collectively called the "synchronizing signal" together with the vertical synchronizing signal). In the description of the operation, the control data is sent at the clock rate, but communication may be sufficiently executed-during the vertical interval by diving the clock in each of the image pickup section 4010 and signal processing section 4020 based on the switching of the vertical synchronizing signal and transmitting and receiving the data based on the divided clocks.

Sixth Embodiment

Figure 12:
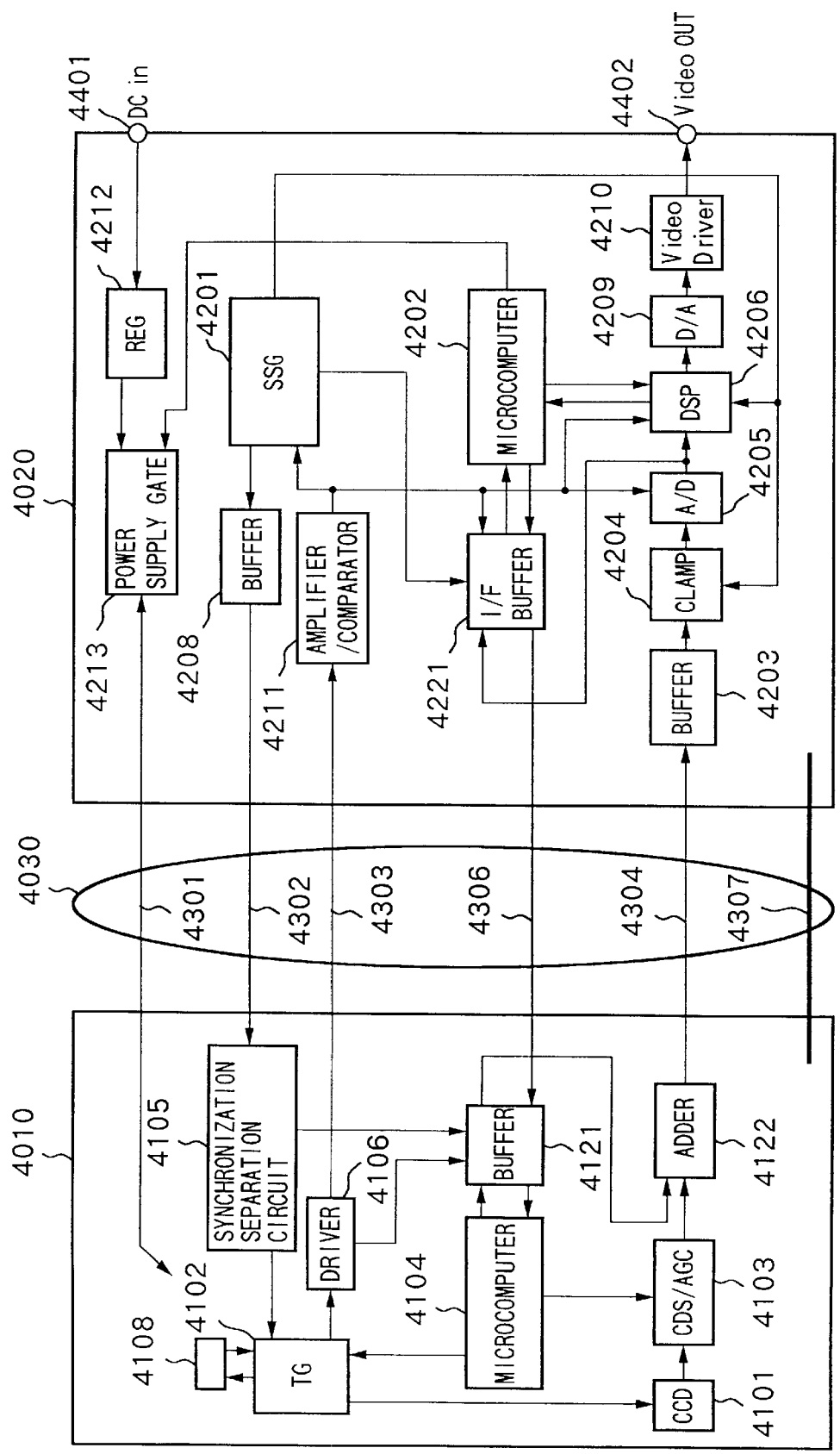
FIG. 12 is a block diagram showing a configuration of an image pickup apparatus according to a sixth embodiment of this invention.

FIG. 12 shows a sixth embodiment wherein the same components as in FIG. 10 have the same reference numerals.

Reference numeral 4121 denotes a buffer that operates in the same manner as the above buffer 4109 but its output is input to an addition circuit 4122, which is described above. The addition circuit 4122 adds an output signal from the buffer 4121 to an output signal from the CDS/AGC circuit 4103 so as to obtain a black level while the data is at a low level whereas obtaining a white level while the data is at a high level. A buffer 4221 operates in the same manner as a buffer 4214 but its input signal is not input from the image pickup section 4010 via an exclusive signal line but from, for example, the highest-bit-data signal output of the A/D conversion circuit 4205.

The sixth embodiment is described with reference to FIG. 12.

The initialization of each section and the transmission of signals are almost the same as described above, so only the differences are described. Data output from the microcomputer 4104 in the image pickup section 4010 is temporarily latched by the buffer 4121 and output to the addition circuit 4122 with the timing of the vertical synchronizing signal. The addition circuit 4122 adds the data signal from the buffer circuit 4121 to an output signal from the CDS/AGC circuit 4103 at a certain level and outputs the value obtained to the signal processing section 4020. An embodiment of the addition circuit 4122 is shown in FIGS. 13 and 14.

Figure 13:
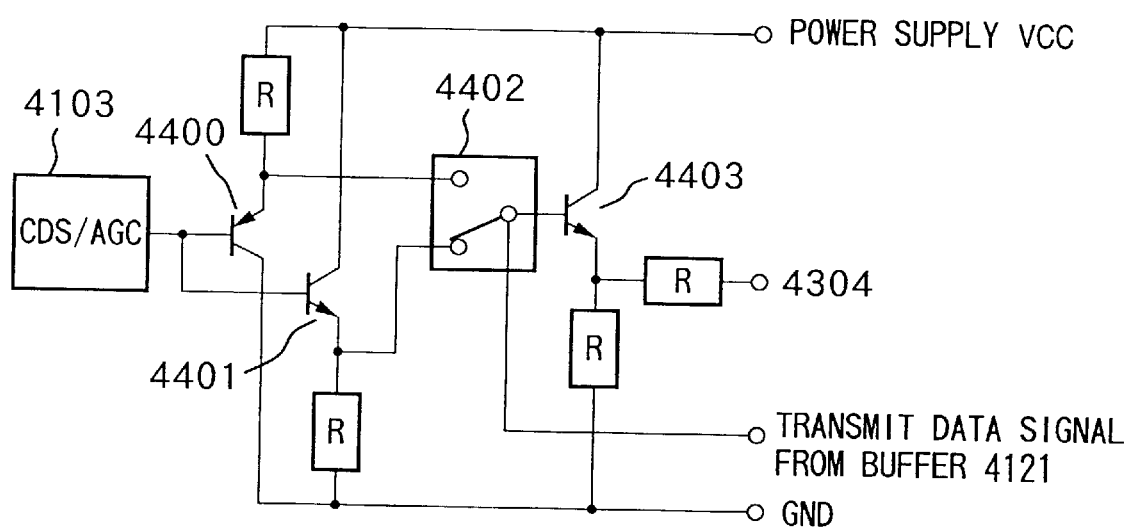
FIG. 13 shows an example of a configuration of an addition circuit according to the sixth embodiment.

In FIG. 13, the output signal from the CDS/AGC circuit 4103 is amplified by a PNP transistor 4400 and an NPN transistor 4401. The difference in potential between these transistors is 2 Vbc, that is, about 1.4 V. An output signal from the PNP transistor 4400 is normally used for output, so if a switch 4402 is used to switch to the output of the NPN transistor 4401 when a high signal is sent from the buffer circuit 4121, a data signal is added to the emitter of an output transistor 4403 at an amplitude of about 1.4 V.

Figure 14:
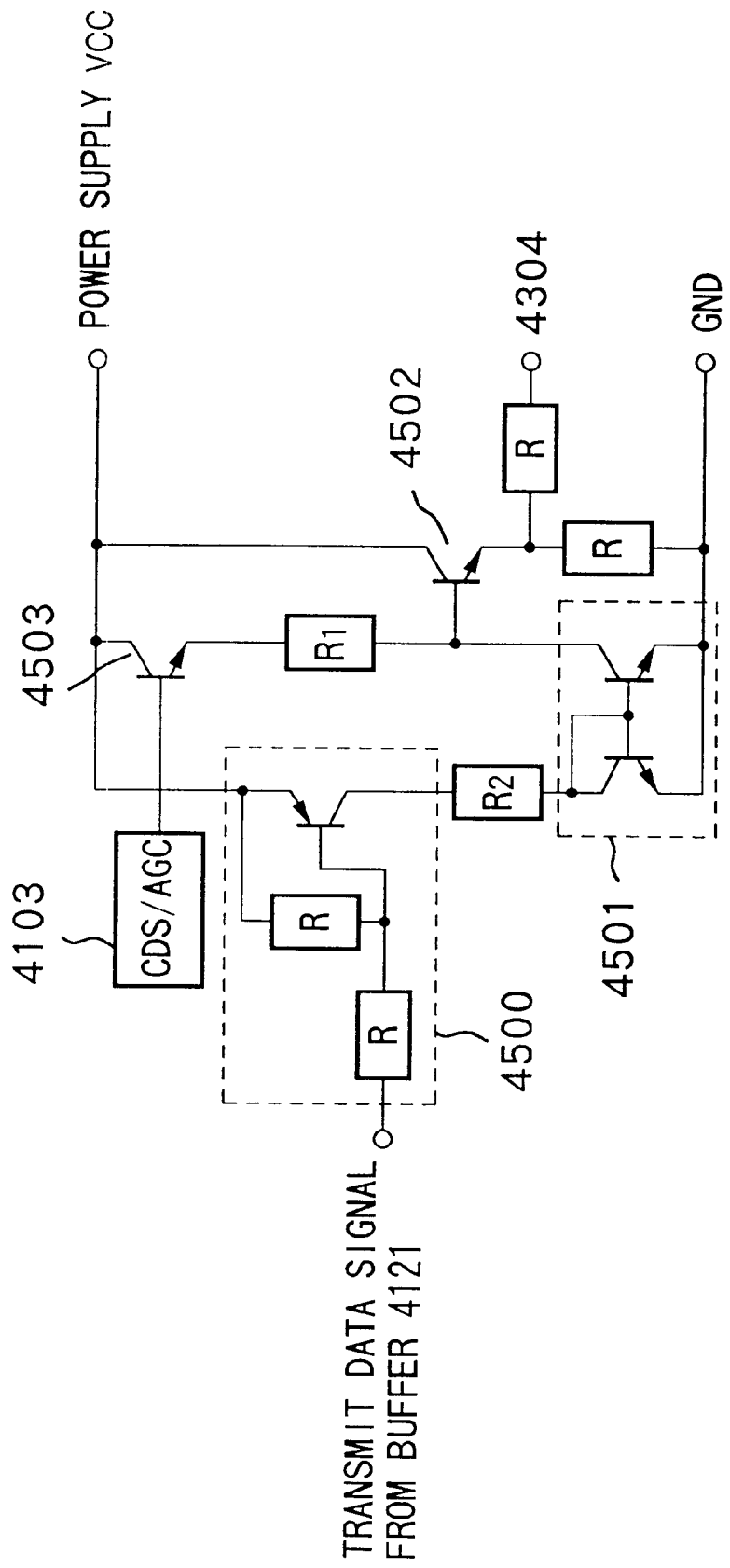
FIG. 14 shows an example of a configuration of an addition circuit according to the sixth embodiment.

In addition, in FIG. 14, a signal from the buffer circuit 4121 turns a transistor switch 4500 on and off and when this signal is low, the transistor is turned on to cause electricity to flow through a transistor 4501. Since two transistors are mirror-connected to the transistor 4501, almost the same current flows through the collector of the two transistors and a video signal with its voltage reduced by a resistor R1 depending on the current is supplied to the base of the transistor 4502. When the signal from the buffer circuit 4121 changes to a high level, the transistor switch 4500 is turned off to prevent a current from flowing through the transistor 4501. Thus, only the base current of the transistor 4503 flows through the resistor R1, that is, little current flows through the resistor R1 and the voltage drop caused by the resistor R1 becomes negligible. These two conditions cause a potential difference expressed as $(R1) \times (Vdd-Vbc)/R2$ to occur in the output stage of the transistor 4502 depending on the output signal from the buffer circuit 4121 (for example, about 1.4 V of potential difference occurs if the power supply voltage is assumed to be 5V and if it is assumed that $R1=330\ \Omega$ while $R2=1\ k\Omega$).

The data signal obtained by the above addition is input to the buffer 4203 via the signal line 4304 together with an output signal from the CDS/AGC circuit 4103 and also input via the clamp circuit 4204 to the A/D conversion circuit 4205, in which the A/D converter 4205 converts it into digital data.

Since the amplitude of the output signal from the CDS/AGC circuit 4103 is about 1.5 Vp-p, the dynamic range of the A/D conversion circuit 4205 is set at 1.5 V and the data added to the video signal is output to the highest bit. This highest bit is transmitted to the DSP 4206 and buffer circuit 4221 and is temporarily stored in the buffer circuit 4221 and output to the microcomputer 4202 as in the fifth embodiment. The method for communication from the microcomputer 4202 to the microcomputer 4104 is the same as in the fifth embodiment, so the description is omitted.

Seventh Embodiment

Figure 15:
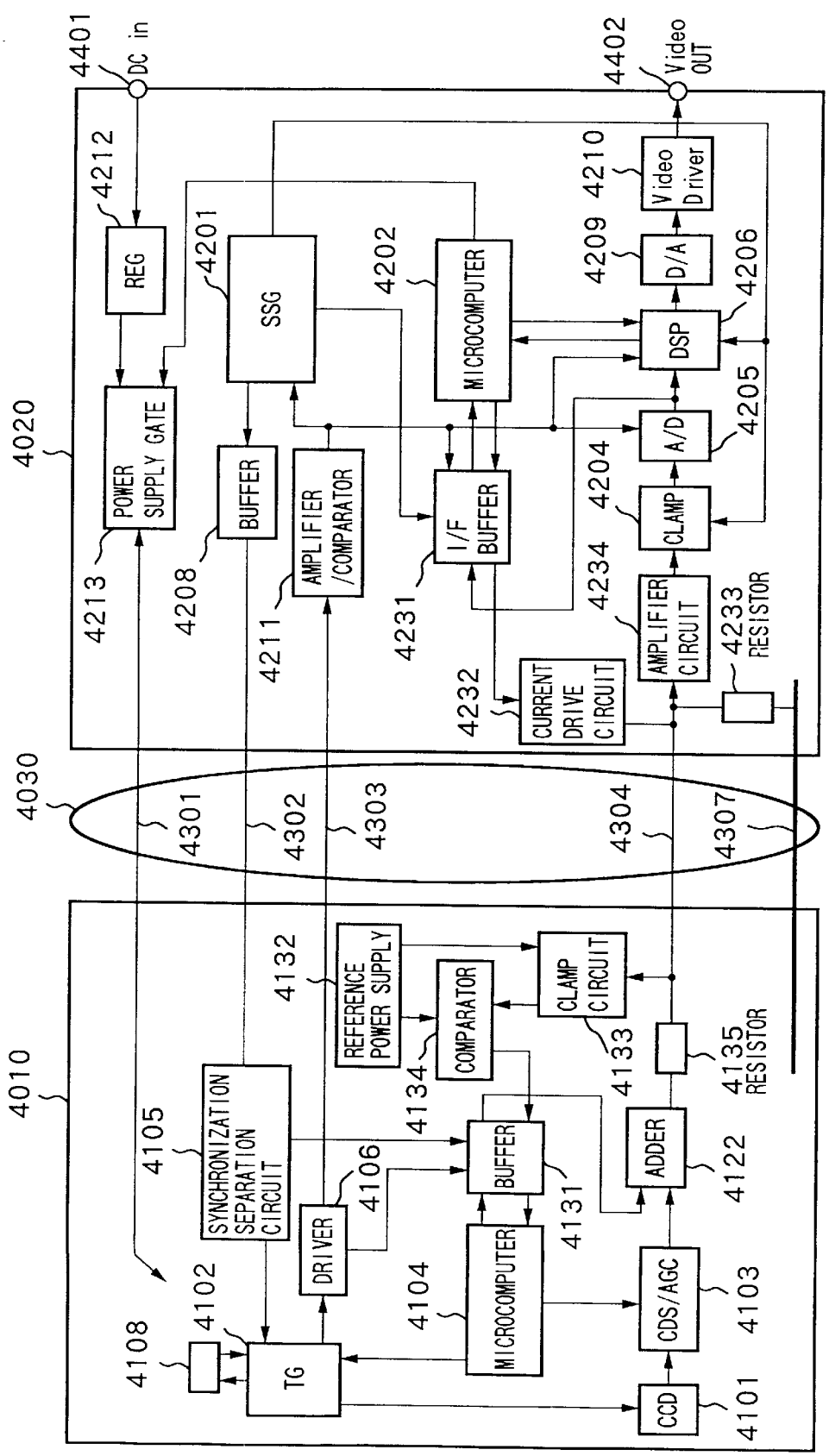
FIG. 15 is a block diagram showing a configuration of an image pickup apparatus according to a seventh embodiment of this invention.

FIG. 15 shows a seventh embodiment. In this figure, numeral 4131 denotes the same buffer circuit as the buffer 4121 in FIG. 12 (the components with the same reference numerals as in FIG. 10 or 12 are omitted) but the data signal, which is input from the signal processing section 4020 in the fifth and sixth embodiments, is input from an output of the comparator 4134, which is described below.

In FIG. 15, numeral 4132 denotes a reference voltage source; numeral 4133 denotes a (for example, diode) clamp circuit that clamps the low level of a signal through a signal line 4304 at a constant value based on the reference-voltage of the reference voltage source 4132; numeral 4134 denotes a comparator that compares voltage based on the reference voltage source 4132 to a signal from the clamp circuit 4133; numeral 4135 denotes an impedance matching resistor used to match with a specific impedance of the signal line 4304; numeral 4231 denotes a buffer circuit that is the same as the buffer 4221 in FIG. 12, comprising the output signal which is output to a driver circuit 4232, which is described below; numeral 4232 denotes a current drive circuit that outputs a current to the signal line 4304 based on a data signal from the buffer circuit 4231 to superpose it on the data signal; numeral 4233 denotes a matching resistor used to match with a specific impedance of the signal line 4304; and numeral 4234 denotes a 6-dB amplifier circuit.

Figure 16:
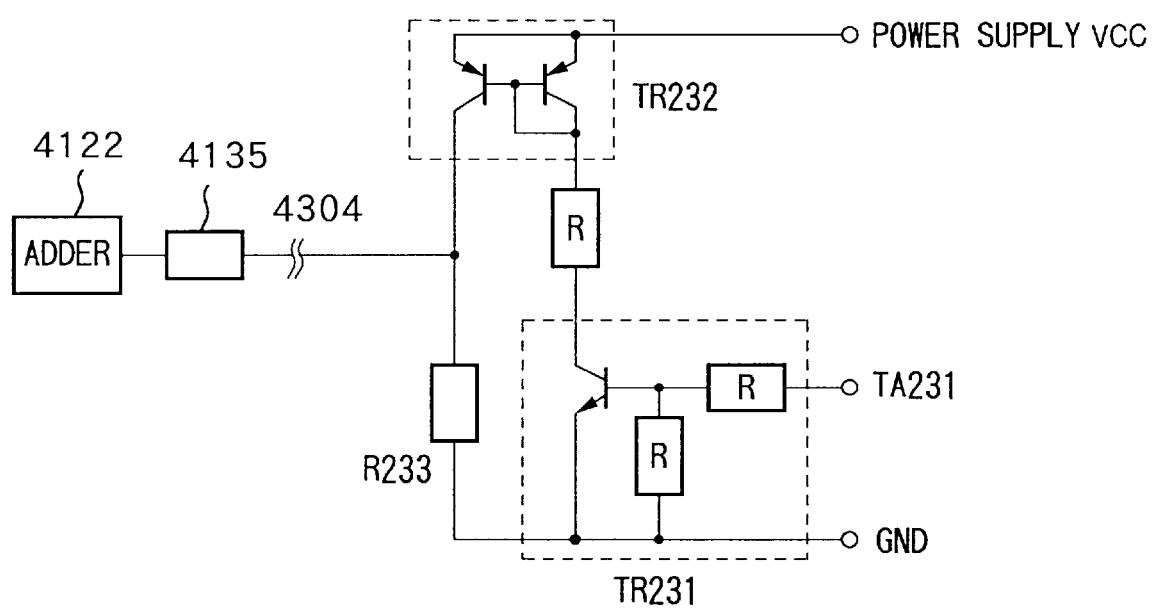
FIG. 16 shows an example of a configuration of a current drive circuit.

FIG. 16 shows an example of a configuration of the current drive circuit 4232. In this figure, R is a resistor, TR is a transistor, and TA231 is a signal line connected between the I/F buffer 4231 and the current drive circuit 4232. In addition, TR231 is a switching transistor and TR232 is a transistor that is current-mirror-connected.

Figure 17:
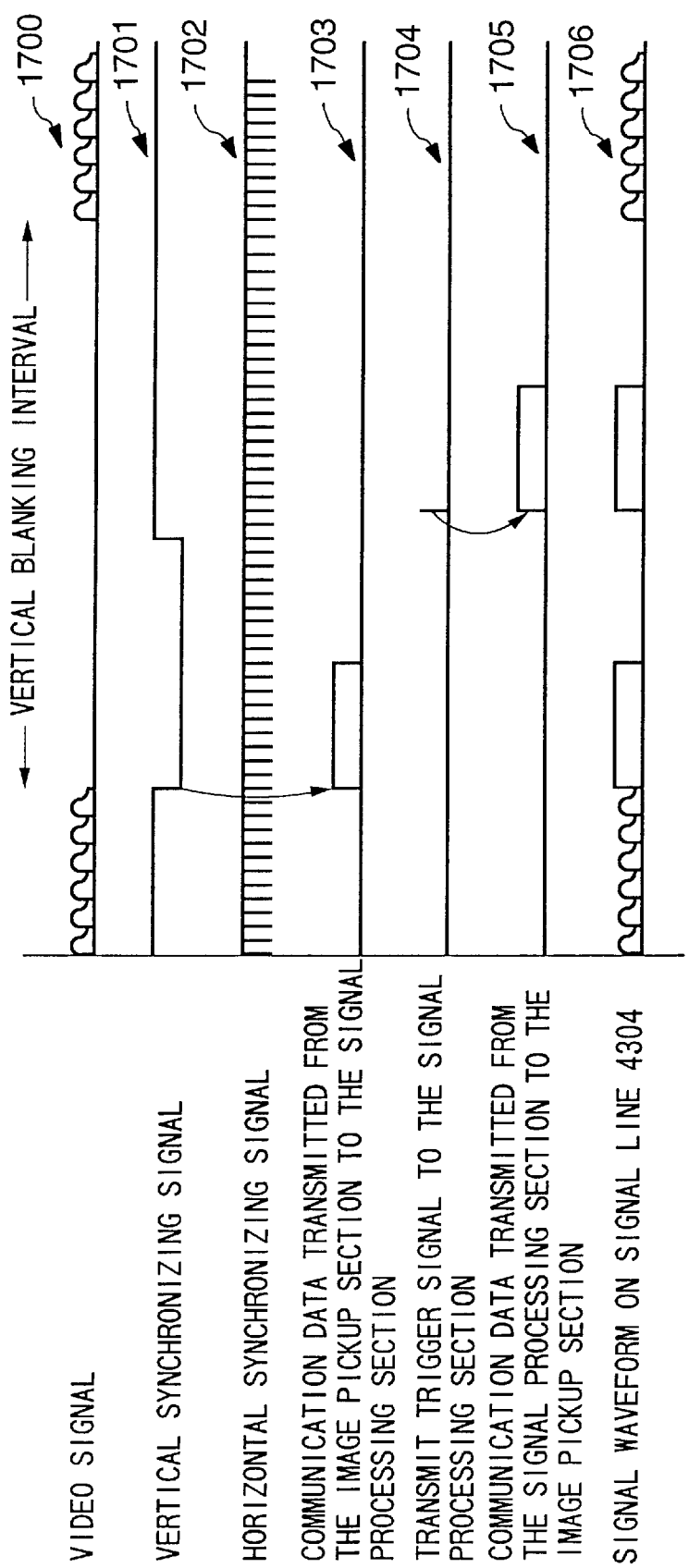
FIG. 17 is a timing chart describing the operation of the seventh embodiment.

FIG. 17 is a timing chart for the seventh embodiment. In this figure, a video signal is output from the CDS/AGC circuit 4103 (1700). A vertical synchronizing signal (1701) and a horizontal synchronizing signal (1702) are transmitted from the synchronization separation circuit 4105 to the buffer 4131, and the vertical synchronizing signal (1701) is sent as a transmit start trigger signal. A data signal (1703) is output from the buffer 4131 and transmitted from the microcomputer 4104 in the image pickup section 4010 to the microcomputer 4202 in the signal processing section 4020. A transmit start trigger signal (1704) is transmitted from the SSG 4201 in the signal processing section 4020 to the buffer 4231. A data signal (1705) is output from the buffer 4231 and is transmitted from the microcomputer 4202 in the signal processing section 4020 to the microcomputer 4104 in the image pickup section 4010. A signal waveform (1706) obtained when the video signal and both data signals are superposed on the signal line 4304.

The seventh embodiment is described with reference to FIGS. 15 to 17.

The initialization of each section is the same as in the sixth embodiment, so only the differences are described.

First, under a transmission condition for a normal signal portion, an output signal from the addition circuit 4122 is output to the signal line 4304 via the matching resistor 4135 and then sent to the signal processing section 4020. In the signal processing section 4020, the input signal is terminated via the matching resistor 4233.

In addition, in the signal processing section 4020, no transmit data is output from the buffer circuit 4231 to the current drive circuit 4232, so a signal sent from the image pickup section 4010 is input to a 6-dB amplifier circuit 4234. A video signal that has been terminated by the matching resistor 4233 is input to the 6-dB amplifier circuit 4234 and amplified by twice before transmission to the clamp circuit 4204. This allows the same signal level as in the fifth and sixth embodiments to be input to the clamp circuit 4204, and the subsequent operation is the same as described in the fifth and sixth embodiments.

Next, the communicated portion of data is described. Data is added to the output signal from the CDS/AGC circuit 4103 in the image pickup section 4010 in the same manner as in the sixth embodiment. The addition interval, however, is limited to, for example, the first nine lines (572 μsec.) of the vertical interval comprising about 22.5 lines (1.43 msec.), thereby limiting the number of data that can be transmitted using the clock frequency used for the data output to the signal processing section 4020 by the buffer 4131. This, however, is not a practical problem because 1,200 bit or more of data can be transmitted using even a transmission clock that is obtained by dividing the clock from the TG 4102 into four frequencies.

In the signal processing section 4020, the transmitted signal is terminated by a terminating resistor 4233 with its amplitude level reduced to half, but the amplitude is recovered to the same level as the output section of the addition circuit 4122 by the 6-dB amplifier 4234. This enables the data to be recovered using the highest bit of the A/D conversion circuit 4205 as in the sixth embodiment and then to be temporarily stored in the buffer 4231, followed by output to the microcomputer 4202.

On the other hand, data is transmitted from the signal processing section 4020 to the image pickup section 4010 by using the current drive circuit 4232 to increase or reduce the terminated voltage at the terminating resistor 4233 by a specified value based on a data signal output from the buffer circuit 4231 in order to superpose the data on the signal line 4304 and to transmit it to the image pickup section 4010.

The operation of the circuit in FIG. 16 is simply described. When a data signal output from the buffer circuit 4231 is input to the terminal TA231, the transistor TR231 is turned on to cause a current to flow through TR232 constituting a current mirror. This causes a voltage shift expressed as:

$$(Ra/2) \times (Vdd - Vbe)/R231$$

to occur in the signal line 4304. That is, the data pulse is superposed on the signal line. In this case, "Ra" indicates the value of the matching resistor. Since a low-level resistor of, for example, 75-Ω is generally used, the superposition of an excessively large pulse is not preferable due to the need for a very large current. As a result, the addition level is about 0.5 V (if the power supply voltage is assumed to be 5 V, R231 is about 680 Ω).

As shown in FIG. 17, the data is sent during the 9H interval in the latter half of the vertical interval. To provide this timing, the transmit start pulse input from the SSG 4201 may be correspondingly delayed.

Next, the image pickup section 4010 carries out reception as follows. The clamp circuit 4133 clamps the base of a signal through the signal line 4304 based on the reference voltage source 4132, the comparator 4134 compares the clamped signal to the reference voltage to detect and separate the data signal obtained by the superposition by the current drive circuit 4232 in the signal processing section 4020 and then outputs this data signal to the buffer circuit 4131. The buffer circuit 4131 executes gating to extract only the data in the latter half of the vertical interval of the signal output from the comparator 4134 and then outputs it to the microcomputer 4104.

By time-dividing the exchange of data between the image pickup section and the signal processing section during the vertical interval as described above, cables can be used to draw the image pickup section away without adding unwanted noise to the video signal.

Time division can also be achieved by alternating bi-directional data communication on a vertical interval basis.

Eighth Embodiment

Figure 18:
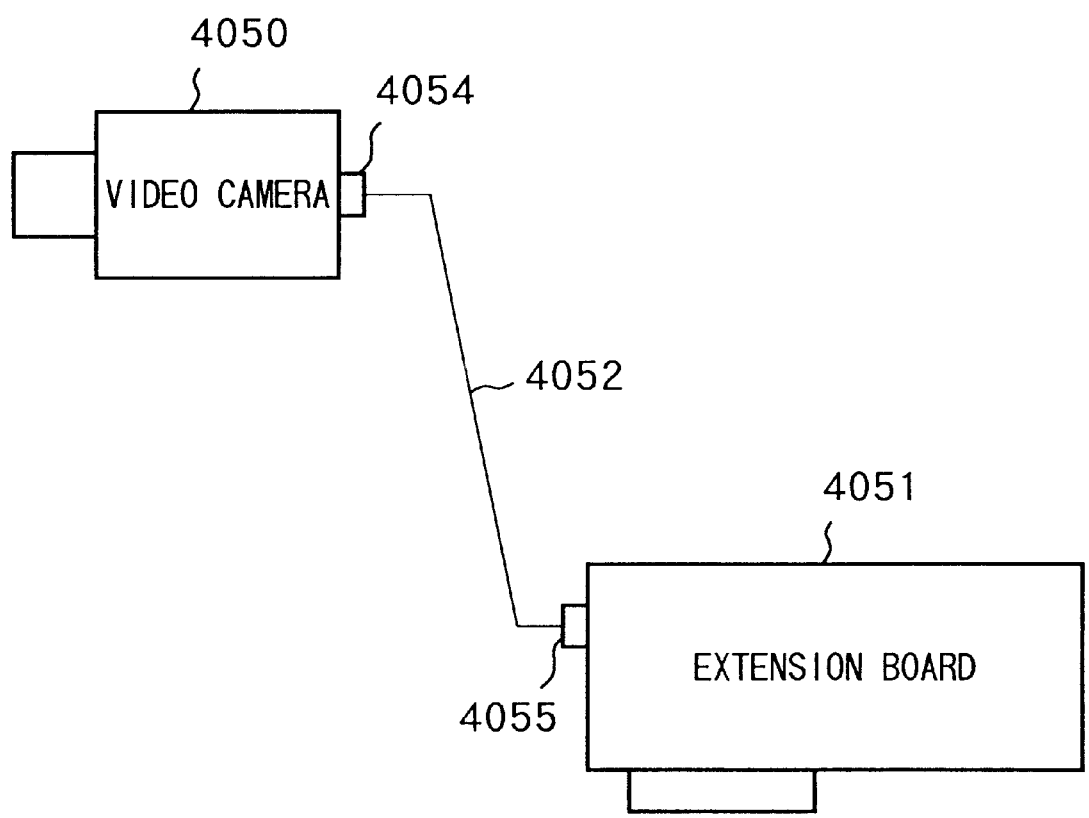
FIG. 18 shows an eighth embodiment of this invention.

FIG. 18 is a block diagram showing a configuration of an image pickup apparatus according to an eighth embodiment of this invention.

In FIG. 18, numeral 4050 denotes a video camera; 4051 is an extension board installed in a personal computer and used as an image processing device to obtain video data from the video camera 4050 and to compress, expand, and communicate this data. Reference numeral 4052 denotes an integrated cable connecting the video camera 4050 and extension board 4051 together, and 4054 and 4055 are connectors for connecting the integrated cable 4052 to the video camera 4050 and extension board 4051. These are a male and a female connectors, and for example, the female connector is provided to the video camera 4050 and extension board 4051 while the male connector is provided to both ends of the integrated cable 4052.

Figure 19:
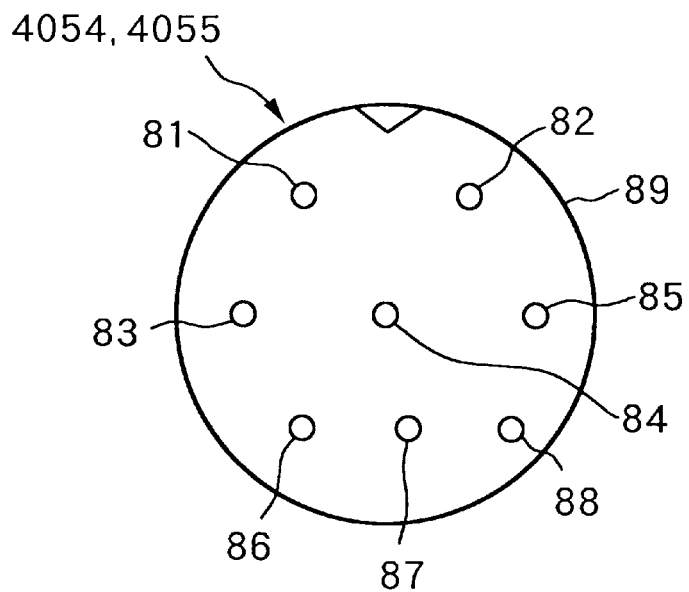
FIG. 19 is a configuration diagram showing a connection section of an 8-pin mini-DIN connector.

FIG. 19 shows the connection section of the connectors 4054 and 4055. The eighth embodiment uses 8-pin mini DIN connectors.

In FIG. 19, numerals 81 to 88 denote terminal pins of the mini DIN connector and numeral 89 denotes a casing shield of the mini DIN connector.

Figure 20:
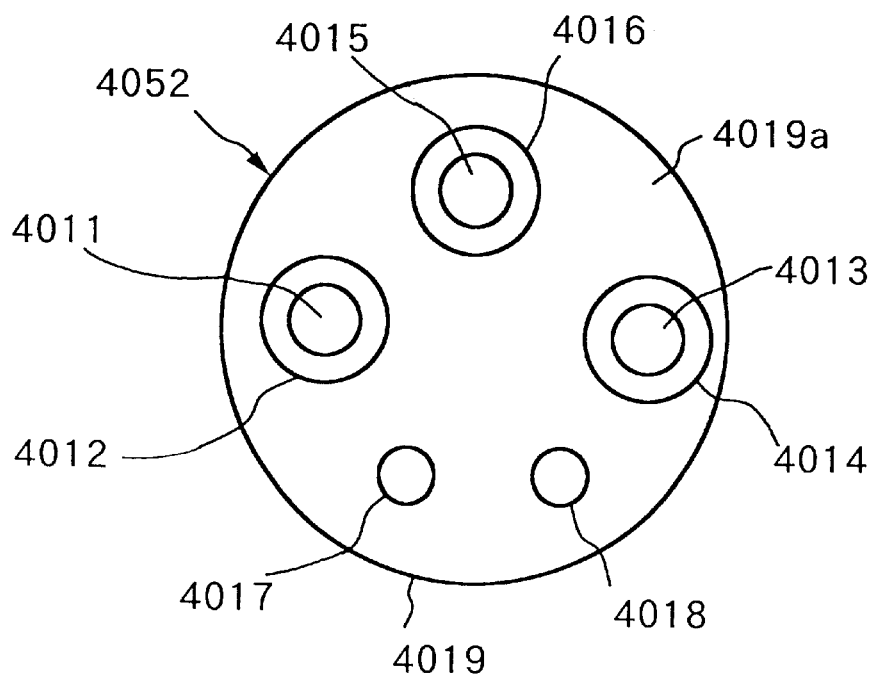
FIG. 20 is a cross sectional view of an integrated cable according to the eighth embodiment.

FIG. 20 is a cross sectional view of the integrated cable 4052. In this figure, numeral 4011 denotes a conductor of, for example, a 75-Ω coaxial cable; numeral 4012 denotes an external conductor of this coaxial cable; numerals 4013 and 4014 and 4015 and 4016 denote similar conductors and external conductors; numeral 4017 denotes a signal line comprising, for example, a twisted wire; numeral 4018 denotes a similar signal line; numeral 4019 denotes a casing shield; and 4019*a* denotes an insulator. The numbers in the parentheses correspond to the pins of the connector.

Figure 21:
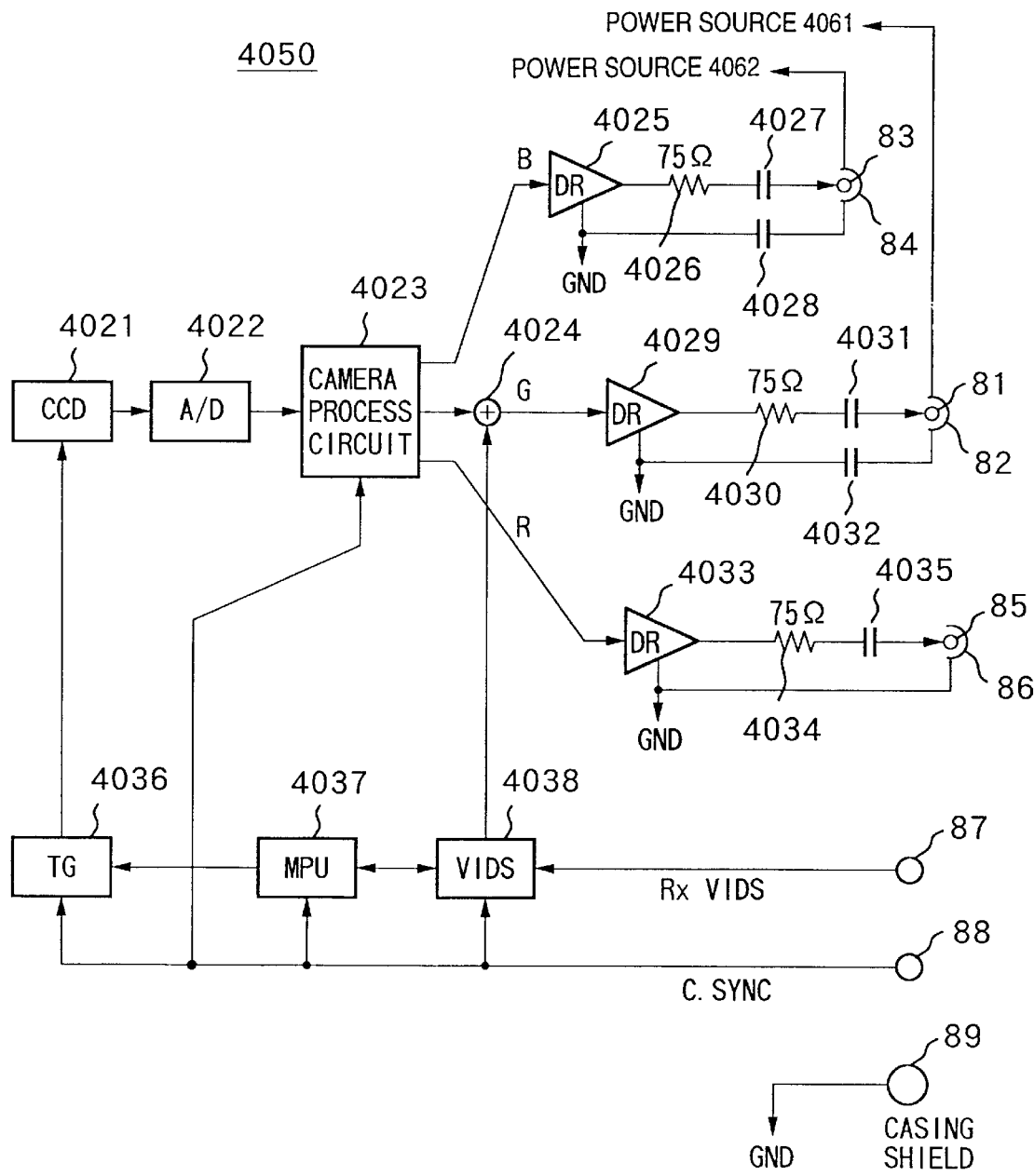
FIG. 21 is a block diagram showing a configuration of a video camera according to the eighth embodiment.

FIG. 21 shows the internal blocks of the video camera 4050. In this figure, numeral 4021 denotes an image pickup element, for example, a CCD; 4022 denotes an A/D converter; 4023 denotes a camera process circuit as a signal processing means; 4024 denotes an adder (mixer); 4025 denotes a 75-Ω drive circuit; 4026 denotes a 75-Ω resistor; 4027 denotes a capacitor for cutting the direct current portion of a signal; 4028 denotes a DC cut capacitor for achieving AC-GND; 4029 denotes a 75-Ω drive circuit; 4030 denotes a 75-Ω resistor; 4031 denotes a capacitor for cutting the direct current portion of a signal; 4032 denotes a DC cut capacitor for achieving AC-GND; 4033 denotes a 75-Ω drive circuit; 4034 denotes a 75-Ω resistor; 4035 denotes a capacitor for cutting the direct current portion of a signal; 4036 denotes a timing generator for driving the CCD; 4037 denotes a microcomputer; and 4038 denotes a processing circuit (hereafter referred to as a "VIDS" (Vertical Interval Data Signal) for transmitting and receiving data only during the image vertical interval. Reference numerals 81 to 89 correspond to FIG. 19.

Figure 22:
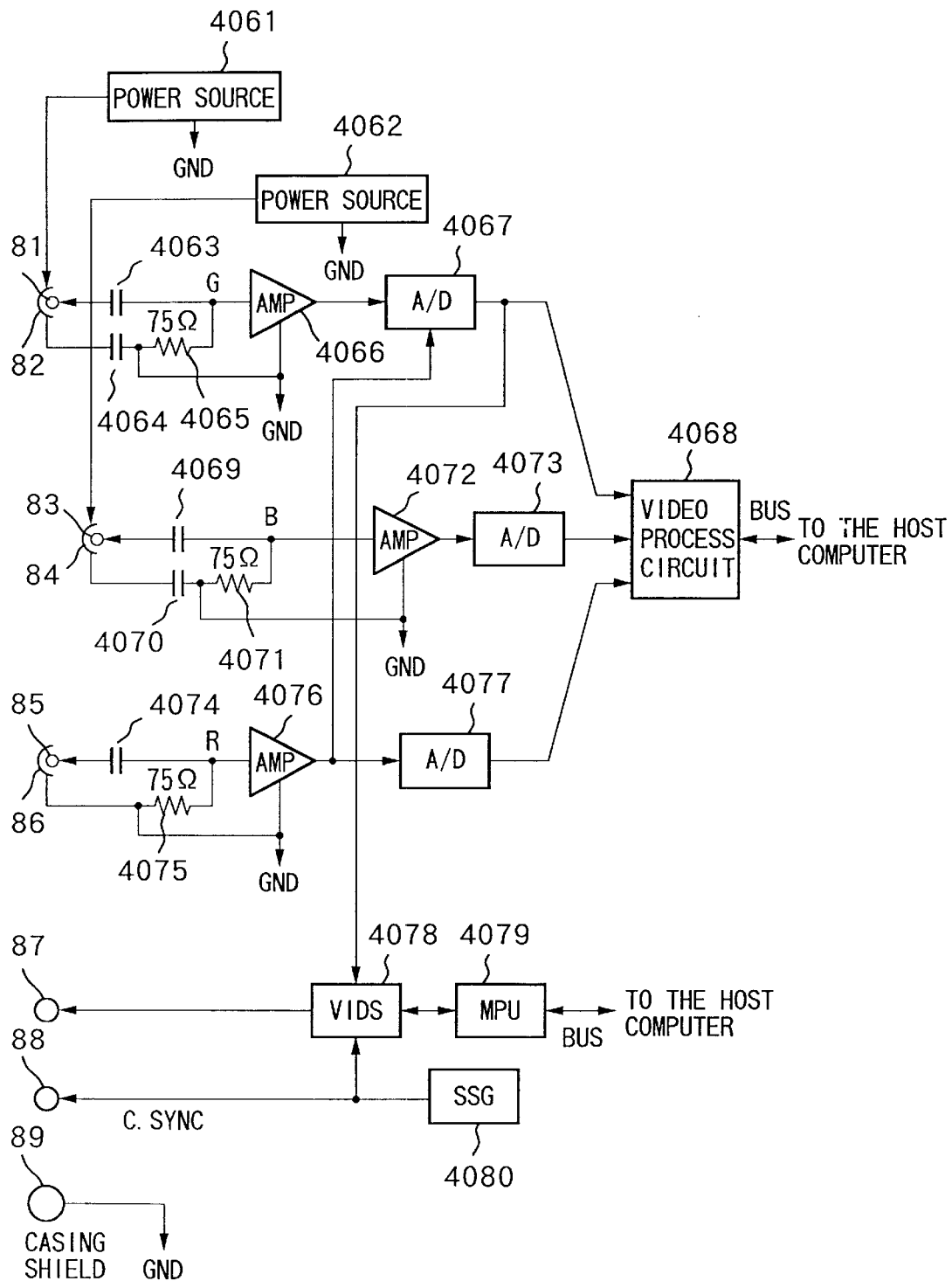
FIG. 22 is a block diagram showing a configuration of an extension board according to the eighth embodiment.

FIG. 22 shows a block diagram of the inside of a personal computer extension board 4051 according to the eighth embodiment. In this figure, numeral 4061 denotes a circuit for supplying a first DC power sent out to the video camera 4050; numeral 4062 denotes a similar circuit for supplying a second DC power; 4063 denotes a capacitor for cutting the direct current portion of a signal; 4064 denotes a cut capacitor for achieving AC-GND; 4065 denotes a 75-Ω terminating resistor; 4066 denotes a video amplifier; 4067 denotes an A/D converter; and 4068 denotes a video process circuit that is an image processing means for compressing image data.

Reference numeral 4069 denotes a capacitor for cutting the direct current portion of a signal; 4070 denotes a cut capacitor; 4071 denotes a 75-Ω terminating resistor; 4072 denotes a video amplifier; 4073 denotes an A/D converter; 4074 denotes a capacitor for cutting the direct current portion of a signal; 4075 denotes a 75-Ω terminating resistor; 4076 denotes a video amplifier; 4077 denotes an A/D converter; 4078 denotes a processing circuit (VIDS) for transmitting and receiving data only during the image vertical interval; 4079 denotes a microcomputer; and 4080 denotes a synchronizing signal generator. Reference numerals 81 to 89 correspond to FIG. 19.

Next, the operation of the eighth embodiment of this invention is described with reference to FIGS. 18 to 22.

First, a cover of a predetermined personal computer (not shown) is opened and the personal computer extension board 4051 according to this embodiment (for example, a PCMCIA card) is inserted into the extension slot (not shown). After insertion, the cover is placed back on the personal computer and the mini DIN connector (for example, the male in FIG. 19) at one end of the integrated cable 4052 is connected to the mini DIN connector (for example, the female in FIG. 19) at one end of the personal computer extension board 4051.

Next, the video camera 4050 is installed on, for example, a monitor (not shown) of the personal computer, and the mini DIN connector (for example, the male in FIG. 19) at the other end of the integrated cable 4052 is inserted into the mini DIN connector (for example, the female in FIG. 19) on the video camera 4050 to complete the connection shown in FIG. 18.

Then, the power supply to the personal computer is turned on, and predetermined software is installed in the computer. The software is then driven to cause a host CPU in the personal computer to initialize the extension board 4051. That is, the video process circuit 4068 and microcomputer 4075 in FIG. 22 are initialized via a bus interface. In this manner, the microcomputer (MPU) 4079 on the extension board 4051 gets ready for receiving a command from the host CPU in the personal computer.

When the user then performs a predetermined operation to instruct, for example, a television conference to be started, the host CPU transmits a predetermined command to the microcomputer (MPU) 4079 to turn on the power to the video camera 4050. On receiving the command, the microcomputer 4079 sends a power-on signal to the power supply circuits 4061 and 4062 to allow a specified DC voltage to be output to the terminal 82 or 84. This DC voltage is output to the external conductors 4012 and 4014 (FIG. 20) of the coaxial cable in the integrated cable 4052 via the terminals 82 and 84 of the 8-pin mini DIN connector (FIG. 19). The DC cut capacitors 4064 and 4070 allow the external conductors 4012 and 4014 of the coaxial cable to be maintained at AC-GND, thereby enabling the supply of the DC voltage.

The DC voltage reaches the video camera 4050 via the integrated cable 4052 and is applied to the terminals 82 and 84 (FIG. 21) of the video camera 4050 via the 8-pin mini DIN connector (FIG. 19). In the video camera 4050, the DC cut capacitors 4028 and 4032 (FIG. 21) allow the external conductors 4012 and 4014 of the coaxial cable to be maintained at AC-GND, thereby enabling the DC voltage to be used as a power supply for the video camera 4050.

As described above, the DC power is supplied to the internal circuit (FIG. 21) of the video camera 4050 to cause the video camera to operate. Although the above embodiment has been described in conjunction with the simultaneous turn-on of the two DC power supplies, the two power supplies may be sequentially turned on. This is effective in providing a power-saving wait mode (part of the power supply is turned off to save required power during standby) for the video camera 4050.

Next, the power to the video camera 4050 is turned on, and after the initialization of the microcomputer (MPU) 4037 (FIG. 21) on the video camera 4050 has been finished, the microcomputer (MPU) 4079 (FIG. 22) on the extension board 4051 controls the VIDS process circuit 4078 to send a predetermined command out to the terminal 87. This command is sent out only during the vertical interval to prevent noise from being mixed in the image.

The command reaches the terminal 87 (FIG. 21) of the video camera 4050 via the signal line 4017 (FIG. 20) of the integrated cable 4052 and is then input to the VIDS process circuit 4038 (FIG. 21) on the video camera 4050. After decoding, the command is sent to the microcomputer (MPU) 4037, which then performs a corresponding operation.

To cause an acknowledge command to be returned, the above command controls the VIDS process circuit 4038 to send a specified acknowledge command out to the adder 4024 (FIG. 21). The adder 4024 superposes the acknowledge command on the vertical interval of an analog G signal from the camera process circuit 4023, and the resulting command is sent out to the terminal via the 75-Ω drive circuit 4029, 75-Ω resistor 4030, and DC cut capacitor 4031.

The analog G signal on which the acknowledge command is superposed (only the vertical interval) reaches the terminal 81 (FIG. 22) of the extension board 4051 via the 75-Ω coaxial conductor 4011 (FIG. 20) of the integrated cable 4052. The analog G signal is transmitted via the DC cut capacitor 4063 and video amplifier 4066 to the A/D converter 4067, in which it is converted into digital data.

The acknowledge command is present in the vertical interval of the digital data and is separated and decoded by the VIDS process circuit 4078 and then sent to the microcomputer 4079 on the extension board 4051. The microcomputer 4079 sends the received acknowledge command to the host CPU on the personal computer via the bus interface. The host CPU thus confirms that the power to the video camera 4050 has been turned on to start it operating correctly.

In the above communication control, the vertical intervals in both directions must be aligned to reduce noise. Thus, a composite synchronizing signal (C. SYNC) from the synchronizing signal generator 4080 (FIG. 22) is supplied to the VIDS process circuit 4078 and simultaneously supplied from the terminal 88 of the extension board 4051 via the signal line 4018 (FIG. 20) of the integrated cable to the terminal 88 (FIG. 21) of the video camera.

Thus, the composite synchronizing signal is also transmitted to the VIDS process circuit 4038 on the video camera 4050, the timing generator 4036 for driving the CCD, and the camera process circuit 4023 to allow both vertical intervals to synchronize with each other, that is, to align both intervals during which the control data is present.

Next, once the power to the video camera 4050 has been turned on to establish bi-directional communication between the video camera 4050 and the extension board 4051, the various controls of the camera, for example, the pan and tilt control of the tripod head (not shown) or the control of the iris of the camera can be provided as described above.

Next, the image system operates as follows.

A video signal from the CCD 4021 (FIG. 21) is converted into digital data by the A/D converter 4022 and supplied to the camera process circuit 4023 that acts as a signal processing means. In the camera process circuit 4023, predetermined color processing and white-balance adjustment are executed, for example, in a digital manner and the signal is subsequently converted into an analog signal by the built-in D/A converter and output as an analog R, an analog G, and an analog B signals.

Thus, when only black and white are used for a television conference to reduce the amount of required data, a monochrome video signal and control data can be extracted by superposing the control data on the G signal and subsequently processing only the G signal.

The G signal on which the control data is superposed is output from the terminal 81 via the 75-Ω drive circuit 4029, 75-Ω resistor 4030, and DC cut capacitor 4031. A return signal for the superposed G signal returns to the GND of the 75-Ω drive circuit 4029 via the DC cut capacitor 4032 from the terminal 82. The "outgoing" and "incoming" signals constitute a pair of alternating components of the superposed G signal, which are transmitted between the conductor 4011 of the 75-Ω coaxial cable (FIG. 20) and the external conductor 4012.

The pair of alternating components of the superposed G signal reaches the terminals 81 and 82 of the extension board 4051 via the integrated cable 4052 and is then supplied to the input and GND of the video amplifier 4066 via the DC cut capacitors 4063 and 4064. The superposed G signal, which has been correctly transmitted at 75-Ω, is amplified in a specified manner and then converted into digital data by the A/D converter 4067. The digital data is sent to the video process circuit 4068 that acts as the image processing means, in which it is subjected to image processing so as to be converted into desired data. This data is sent out to the host CPU via the bus interface.

Except that the control data is not superposed on the vertical interval, the B signal is processed in the same manner as the G signal and sent through the capacitors 4069 and 4070, amplifier 4072, and A/D converter 4073 to the video process circuit 4068 that acts as the image processing means in which it is compressed.

Furthermore, the alternating components of the R signal reach the terminals 85 and 86 of the extension board 4051 via the integrated cable 4052 and are supplied to the input of the video amplifier 4076 via the DC cut capacitor 4074. The R signal, which has been correctly transmitted at 75-Ω, is amplified in a specified manner and then converted into digital data by the A/D converter 4077. The digital data is sent to the video process circuit 4068 that acts as the image processing means, in which it is subjected to image processing so as to be converted into desired data. This data is sent out to the host CPU via the bus interface.

As described above, the eighth embodiment integrates the DC power supply, R, G, and B signals, and control signal into the single cable connecting the video camera 4050 and extension board 4051 together, in order to apparently provide all main wiring that is otherwise required in a desk top television conference system to connect the video camera 4050 and extension board 4051 together. To give top priority to cost reduction, the integrated cable 4053 is assumed to use the mini DIN connectors and to use 8-pin connectors because 4 or 8 pins are most generally used and are most inexpensive among 3, 4, 6, 7, and 8-pins that can be used for mini DIN connectors. The 4- and 8-pin DIN connectors are inexpensive because 4-pin DIN connectors are used for an S video cable and because 8-pin DIN connectors are used as RS232C connectors for personal computers.

The integrated cable 4052 using 8-pin mini DIN connectors is configured as follows.

(1) The video signal uses three coaxial cables for R, G, and B, the R, G, and B signals are passed through the coaxial conductors, and the external conductors for B and G are used as the AC-GND lines that cut DC components.

(2) The DC power supply is sent to the coaxial external conductors for B and G and the casing shield 89 of the integrated cable 4052 is used as the GND for the DC power supply.

(3) The control signals are based on synchronizing serial communication and include three signals: a synchronizing clock, RX, and TX. The TX signal from the video camera 4050 is multiplexed on the vertical interval of, for example, the G signal of the video signal. The two signal lines are used for the synchronizing clock and the RX signal to the video camera 4050. The casing shield 89 of the integrated cable 4052 is used as the GND of the these two signal lines.

In summary, the eight pins consisting of the three coaxial cables and the two signal lines are used for the DC power supply, R, G, and B signals, thereby enabling the use of 8-pin DIN connectors.

Ninth Embodiment

Figure 23:
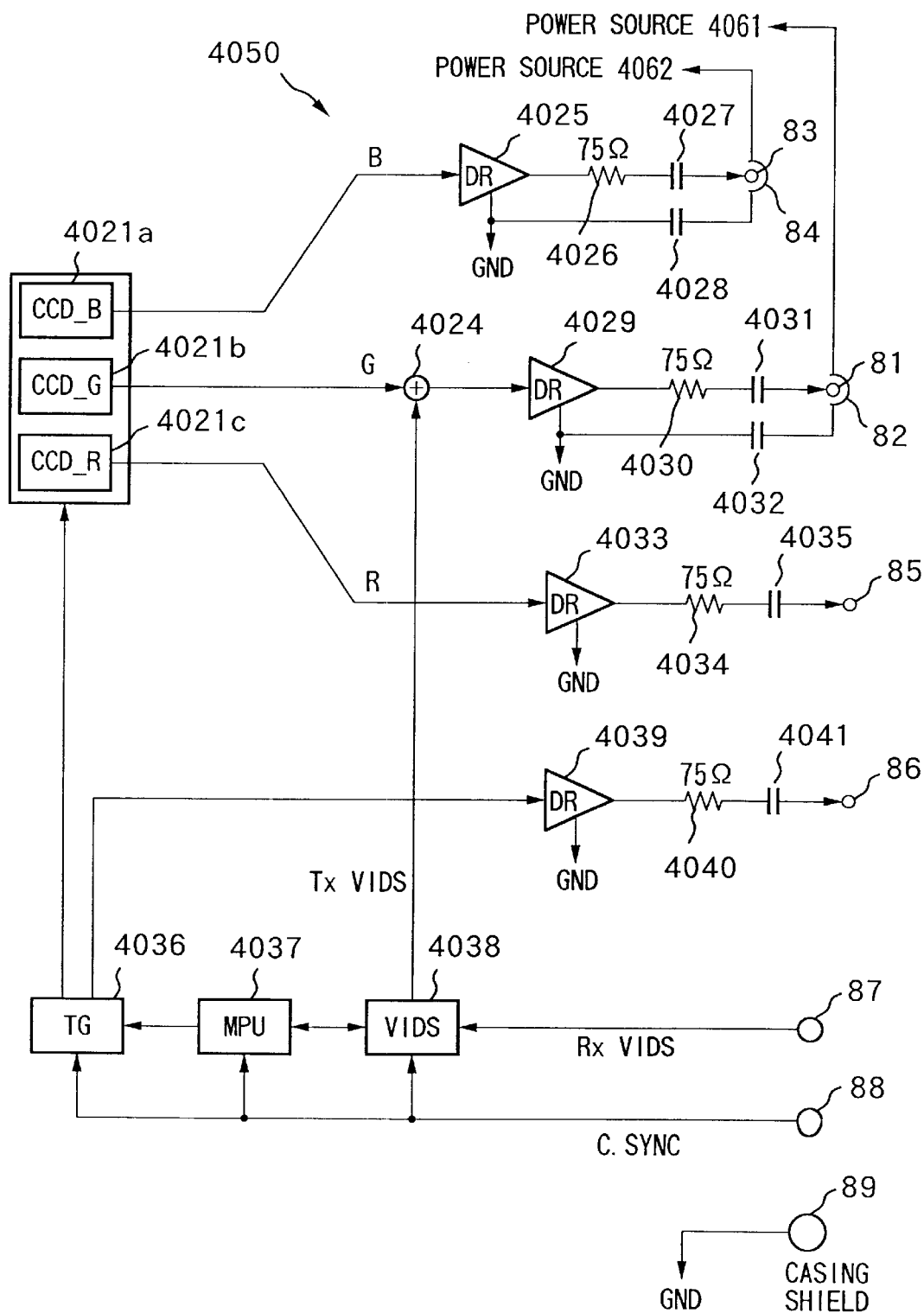
FIG. 23 is a block diagram showing a configuration of a video camera according to a ninth embodiment.
Figure 24:
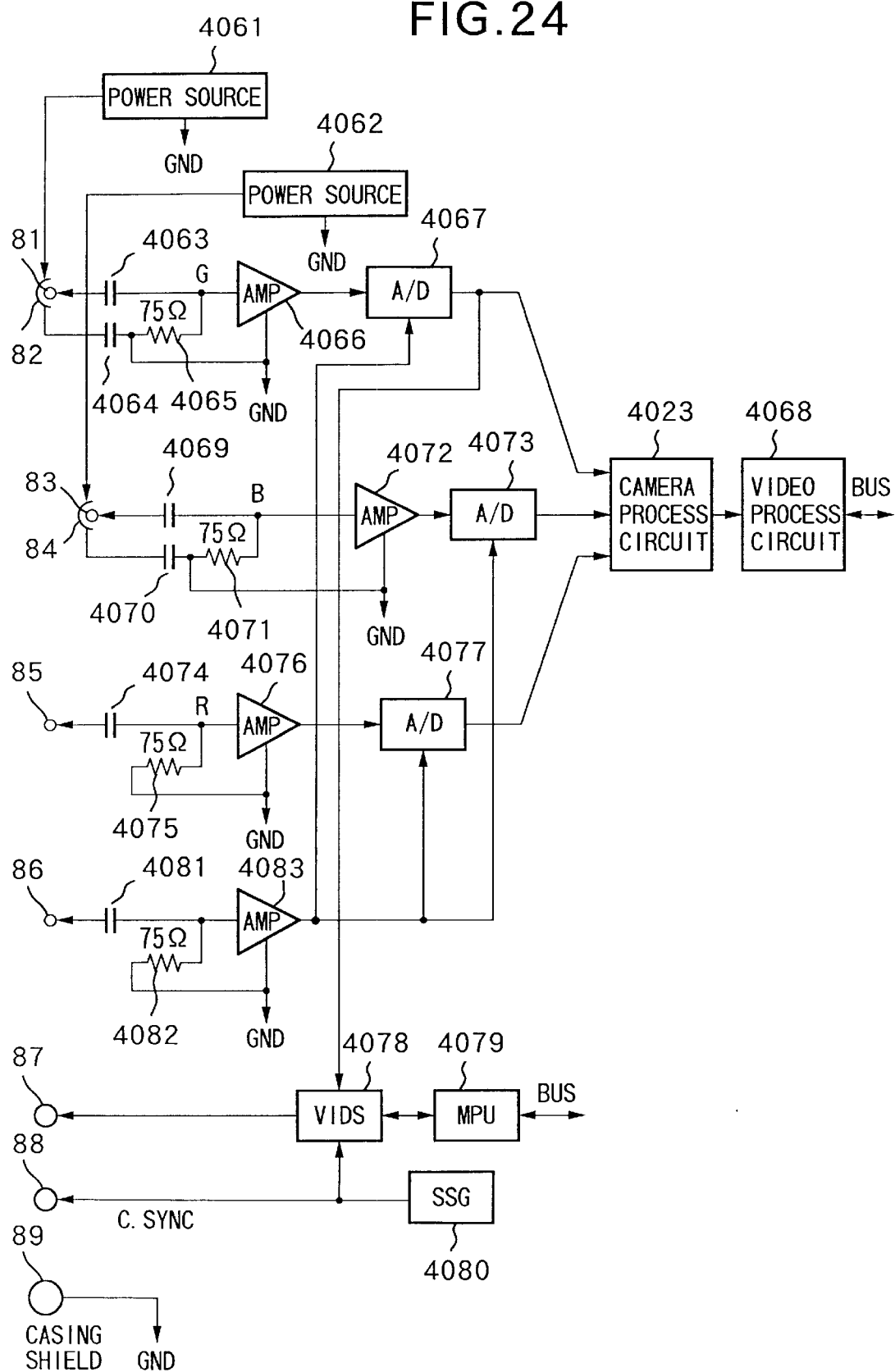
FIG. 24 is a block diagram showing a configuration of an extension board according to the ninth embodiment.

FIG. 23 is a block diagram showing the video camera 4050 according to a ninth embodiment of this invention. FIG. 24 is a block diagram of the extension board 4051.

The ninth embodiment differs from the eighth embodiment in that instead of sending the R, G, and B signals from the CCD 4021 via the A/D converter to the camera process circuit 4023 and processing them in the circuit 4023 in the eighth embodiment, an image pickup element such as a three-plate CCD is used to directly obtain the R, G, and B output signals to superpose the control data on the vertical interval of the G signal.

In addition, a "CCD signal sampling clock" from the timing generator 4036 (FIG. 23) is used as a signal for allowing the camera 4050 to synchronize with the board 4051.

The CCD may not be a three-plate-image pickup element but an element that independently outputs an RGB image pickup signals.

That is, in the block diagram of the video camera 4050 in FIG. 23, an output signal from the CCD 4021b exclusively used for the G signal is sent to the adder 4024 and the control data is superposed on the vertical interval. The CCD signal sampling clock from the timing generator 4036 is transmitted to the 75-Ω drive circuit 4039.

Figure 25:
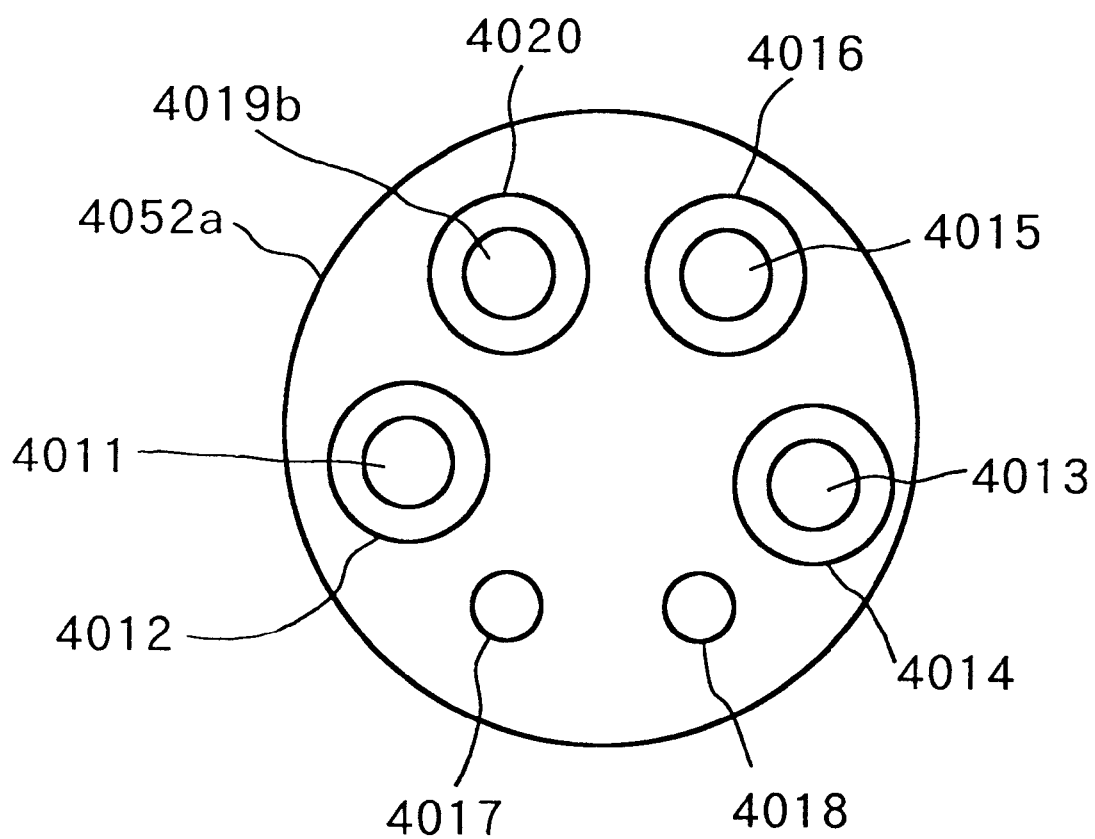
FIG. 25 is a cross sectional view of an integrated cable according to the ninth embodiment.

FIG. 25 is a cross sectional view of an integrated cable 4052a for implementing the above apparatus. This is the same as the eighth embodiment except for the addition of a coaxial cable comprising a 75-Ω coaxial cable conductor 4019 and an external conductor 4020. In addition, the external connectors 4020 and 4016 are short-circuited at their tips by the casing shield.

The G CCDb signal, which has reached the extension board 4051 in FIG. 25 via the integrated cable 4052a, is transmitted to the A/D converter 4067. The sampling clock (CCDCLK) from the A/D converter 4067 is transmitted to the A/D converter 4067 (FIG. 24) via the video amplifier 4083. Similarly, the B CCDa signal is sent to the A/D converter 4073 and the R CCDc signal is sent to the A/D converter 4077. The A/D converters 4073 and 4077 operate based on the same sampling clock as described above.

Output digital data from the A/D converters 4067, 4073, and 4077 is sent to the camera process circuit 4023, in which predetermined color processing and white-balance adjustment are digitally executed. That is, the camera process as the signal processing means is carried out on the extension board 4051, and this is a significant difference from the eighth embodiment that carries out the camera process on the video camera 4050.

According to the eighth and ninth embodiments, (1) the power supply, control data, and video cables are all integrated together so that a single cable can connect the video camera 4050 and extension board 4051 together, thereby improving reliability and appearance.

(2) the need for the RS232C terminal of the personal computer, which has been used to control the camera, is eliminated, and this terminal can be used to connect other device such as a modem or printer.

(3) since the power to the video camera 4050 is supplied from the extension board 4051, the need for the AC adapter is eliminated to reduce system costs and to prevent the operator from forgetting to turn on the power to the video camera, thereby improving operability.

(4) in the ninth embodiment, the camera process as the signal processing means is executed on the extension board 4051, thereby reducing the size of the video camera 4050 and also reducing the number of required video A/D converters down to three (four in the eighth embodiment), thereby reducing costs.

(5) when only black and white are used for a television conference to reduce the amount of required data, a monochrome video signal and control data can be obtained by superposing the control data on the G signal and subsequently processing only the G signal.

Tenth Embodiment

Figure 26:
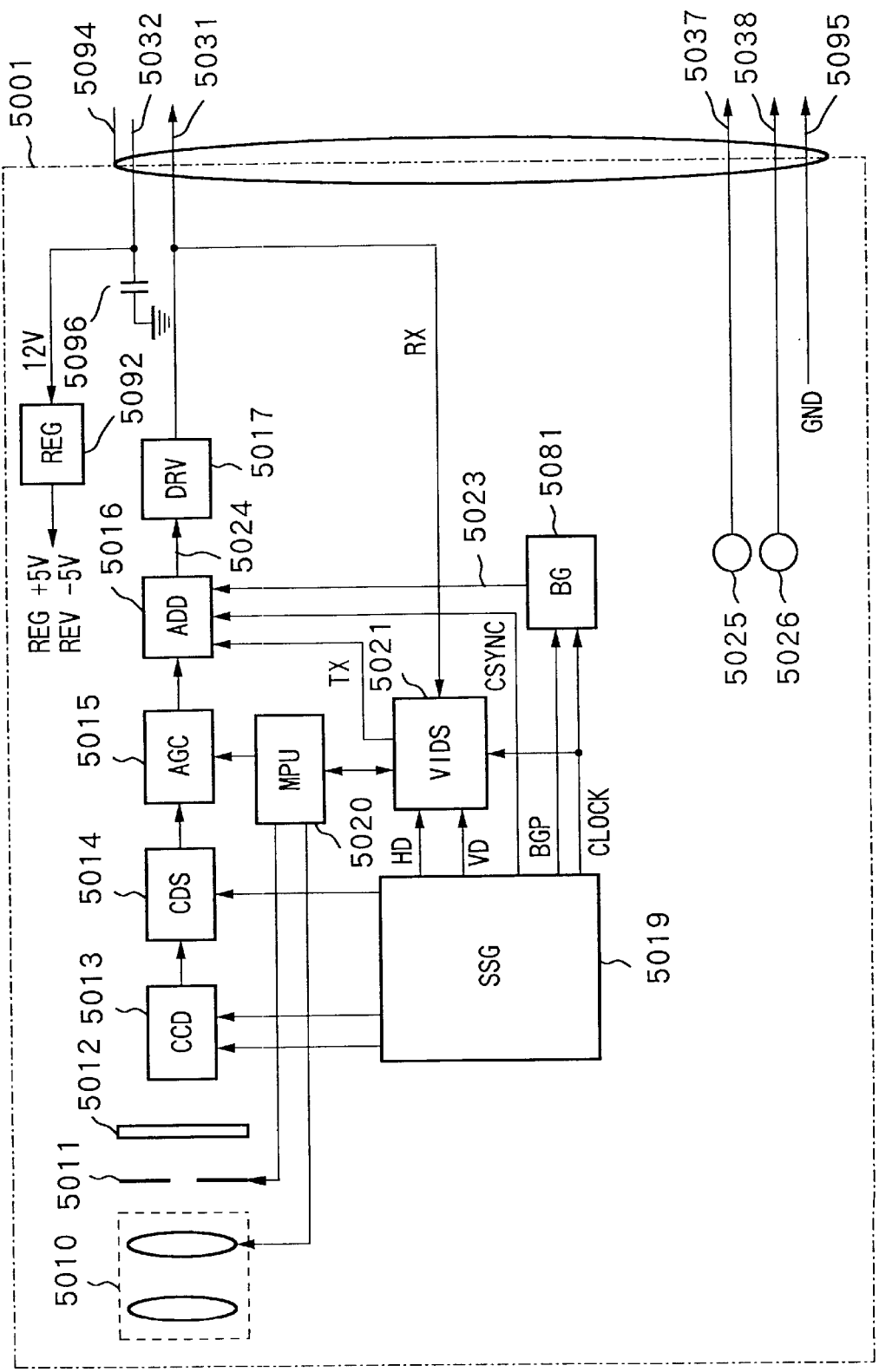
FIG. 26 is a block diagram showing a configuration of a camera section according to a tenth embodiment of this invention.

FIG. 26 is a block diagram showing a configuration of a camera section 5001 according to a tenth embodiment of this invention.

In this figure, the camera section 5001 has a zoom lens 5010; an iris 5011; an optical lowpass filter and infrared cut filter 5012; a CCD 5013; a CDS circuit 5014; an AGC circuit 5015; an addition circuit 5016 for adding a CCD signal, controlling transmit data, a reference clock, and a synchronizing signal together; a drive circuit 5017 for driving a 75-Ω coaxial cable 5094; a synchronizing signal generator 5019; an MPU 5020 that controls the entire camera section 5001; a burst gate (BG) circuit 5081 that provides gating to add a video signal to a clock; a processing circuit 5021 (hereafter referred to as a "VIDS" (Vertical Interval Data Signal) that transmits and receives control data during the synchronizing signal interval of the video signal; a regulator (REG) 5092 that generates +5 V and −5 V from a power supply voltage of 12 V; a right stereo microphone 5025; and a left stereo microphone 5026. The regulator 5092 inputs to a video signal return signal line 5032 a 12-V voltage signal that has been multiplexed in order to generate +5 V and −5 V. Reference numeral 5094 denotes a multi-conductor shield cable, 5095 is a GND line corresponding to the shield portion of the multi-conductor shield cable 5094 and numeral 5096 denotes a coupling capacitor for cutting DC voltage.

A signal line 5031 transmits to an image processing section 5003 (FIG. 27), which is described below, a synchronizing signal (CSYNC) and a clock (CLOCK) from the synchronizing signal generator 5019 and a video signal (SIGNAL) on which controlling transmit data (TX) from the processing circuit 5021 is multiplexed. Controlling receive data (RX) is multiplexed on the signal line 5031 by the image processing section 5003 and received and analyzed by the processing circuit 5021, and the signal line 5031 is configured to receive each command from the image processing section 5003. Reference numeral 5037 denotes an output signal line for outputting an audio signal from the right stereo microphone, while reference numeral 5038 denotes an output signal line for outputting an audio signal from the left stereo microphone. The multi-conductor shield cable 5094 is a coaxial cable connecting the camera section 5001 and image processing section 5003 together.

The operation based on the above configuration is described below.

A video incident through the zoom lens 5010, iris 5011, and optical lowpass filter and infrared cut filter 5012 is formed on the light-receiving surface of the CCD 5013, which converts the image into an electric signal. The video signal, which has been converted into the electric signal, is output to the addition circuit 5016 via the CDS circuit 5014 and AGC circuit 5015. The synchronizing signal generator 5019 outputs various synchronizing pulses used by the CCD 5013 for photographing, a horizontal and a vertical synchronizing signals (HD and VD), a composite synchronizing signal (CSYNC), a burst gate pulse (BGP), and a clock signal (CLOCK) that is used as a reference for photographing. Based on the burst gate signal (BGP) from the synchronizing signal generator 5019, the burst gate circuit (BG) 5081 outputs the input clock signal (CLOCK) as a burst clock 5023 suitable for addition to the video signal. The processing circuit (VIDS) 5021 separates from the video signal on the signal line 5031 controlling receive data (RX) that has been added by the image processing section 5003, and outputs it to the MPU 5020. The MPU 5020 inputs to the processing circuit 5021 the controlling transmit data (TX) to be sent to the image processing section 5003, and the processing circuit 5021 outputs the data to the addition circuit 5016. This VIDS communication via the processing circuit 5021 is all executed in synchronism with the horizontal and vertical synchronizing signals (HD and VD) and clock (CLOCK) from the synchronizing signal generator 5019.

The addition circuit 5016 receives the video signal output from the AGC circuit 5015, the controlling transmit data (TX) from the processing circuit 5021, the burst clock 5023 from the BG circuit 5081, and the composite synchronizing signal (CSYNC) from the synchronizing signal generator 5019 to add (multiplex) them together. Thus, a video signal 5024 on which these signals are multiplexed is driven by the 75-Ω drive circuit 5017 and output to the image processing circuit 5003 via the signal line 5031 in the multi-conductor cable 5094. As described above, the MPU 5020 that controls the entire camera section 5001 can communicate with the processing circuit (VIDS) 5021 to obtain the controlling receive data (RX) in order to communicate with the image processing section 5003. Based on the communication with the image processing section 5003, the MPU controls the magnification of the zoom lens 5010 and the auto-focus lens (not shown) as well as the value of the iris 5011 and the gain of the AGC circuit 5015. In addition, input signals from the stereo microphones 5025 and 5026 are output to the image processing section 5003 via output signal lines 5037 and 5038.

In the configuration in FIG. 26, a voltage (in this case, +12 V) is supplied to the camera section 5001 from the image processing section 5003 via the return signal line 5032 in the multi-conductor shield cable 5094. The signal line 5032 also functions as a return signal line for the video signal on the signal line 5031. Since the video signal propagating through the signal line 5031 is subjected to alternate coupling, the voltage is multiplexed on the video signal return signal line 5032. The voltage signal thus supplied via the line 5032 is shut off from a GND 5095 by the coupling capacitor 5096, while only the return current of the alternating video signal passes through the capacitor 5096 and flows into the GND 5095.

According to the tenth embodiment, the video signal line 5031 is connected to the signal line in the coaxial cable and the power supply voltage is connected to the shield line in the coaxial cable. The coaxial cable in which the signal line 5031 and shield line 5032 are connected together has a characteristic impedance of 75-Ω, but action must be taken to make the characteristic impedance of the coaxial cable effective on the video signal on the signal line 5031 or to prevent or limit the flow of the video signal into the shield portion 5095 that acts as a GND as described below.

Thus, with respect to the impedance between the video signal from the camera section 5001 and the GND line 5095 as seen from the video signal line 5031 in the camera section 5001, the wiring pattern of the signal lines and the position of the coupling capacitor 5096 must be set so that the impedance of the route "the signal line 5031 in the camera section 5001—the multi-conductor shield cable 5094 (signal line 5031)—the video signal line 5031 in the image processing section 5003—the GND 5095 in the image processing section 5003—the coupling capacitor 5097 in the image processing section 5003—the return signal line 5032 in the multi-conductor shield cable 5094—the coupling capacitor 5096 in the camera section 5001—the GND 5095 in the camera section 5001" is much lower than that of the route "the video signal line 5031 in the camera section 5001—the multi-conductor shield cable 5094 (signal line 5031)—the video signal line 5031 in the image processing section 5003—the GND line 5095 in the image processing section 5003—the shield portion 5095 in the multi-conductor shield cable 5094—the GND 5095 in the camera section 5001".

The cable 5094 is the entire multi-conductor shield cable connecting the camera section 5001 and image processing section 5003 together, and 5095 is the shield portion in the multi-conductor shield cable 5094. The shield portion 5095 acts as a reference GND for the group of signal lines connecting the camera section 5001 and image processing section 5003 together.

Figure 27:
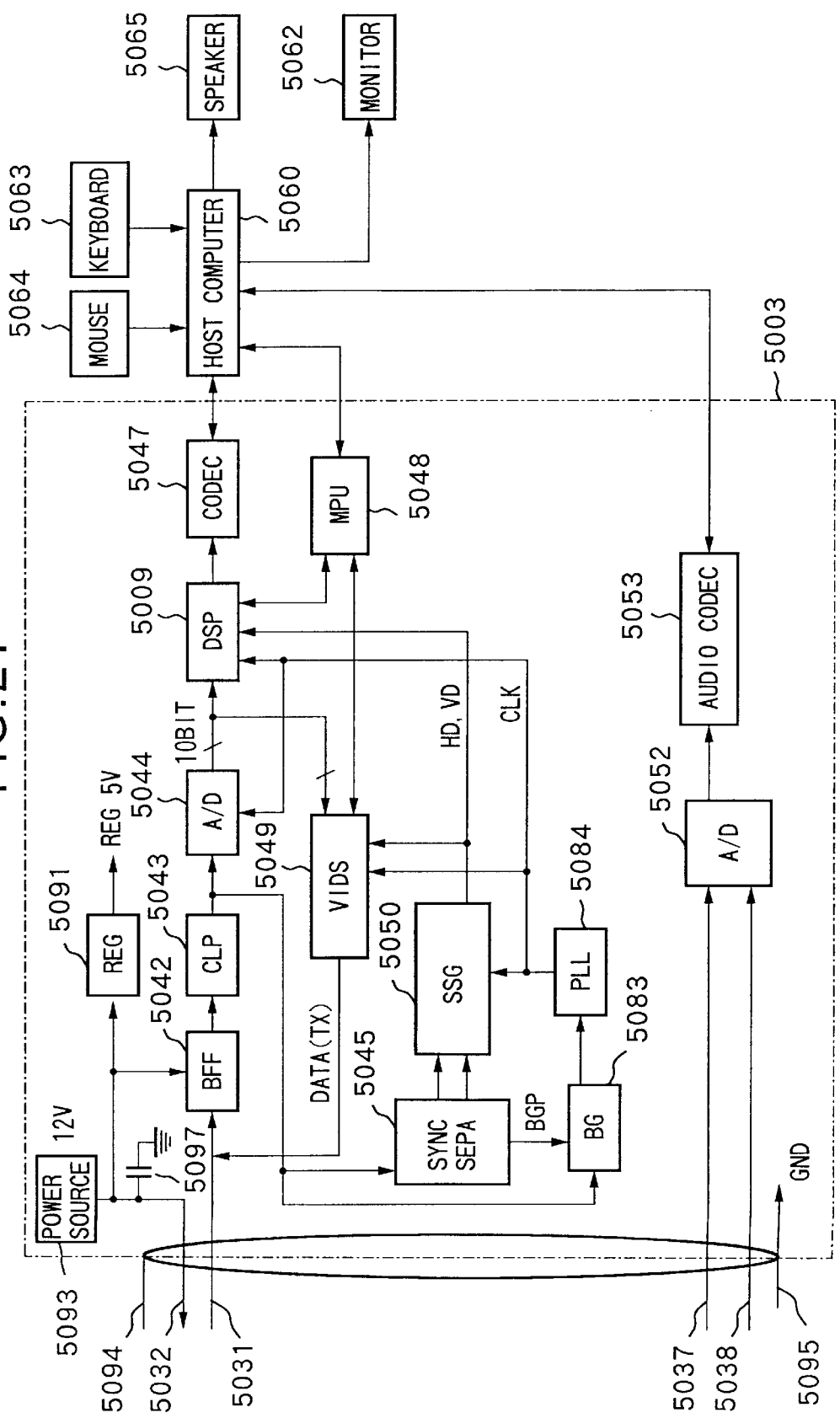
FIG. 27 is a block diagram showing a configuration of a host computer including an image processing section according to the tenth embodiment of this invention.
Figure 28:
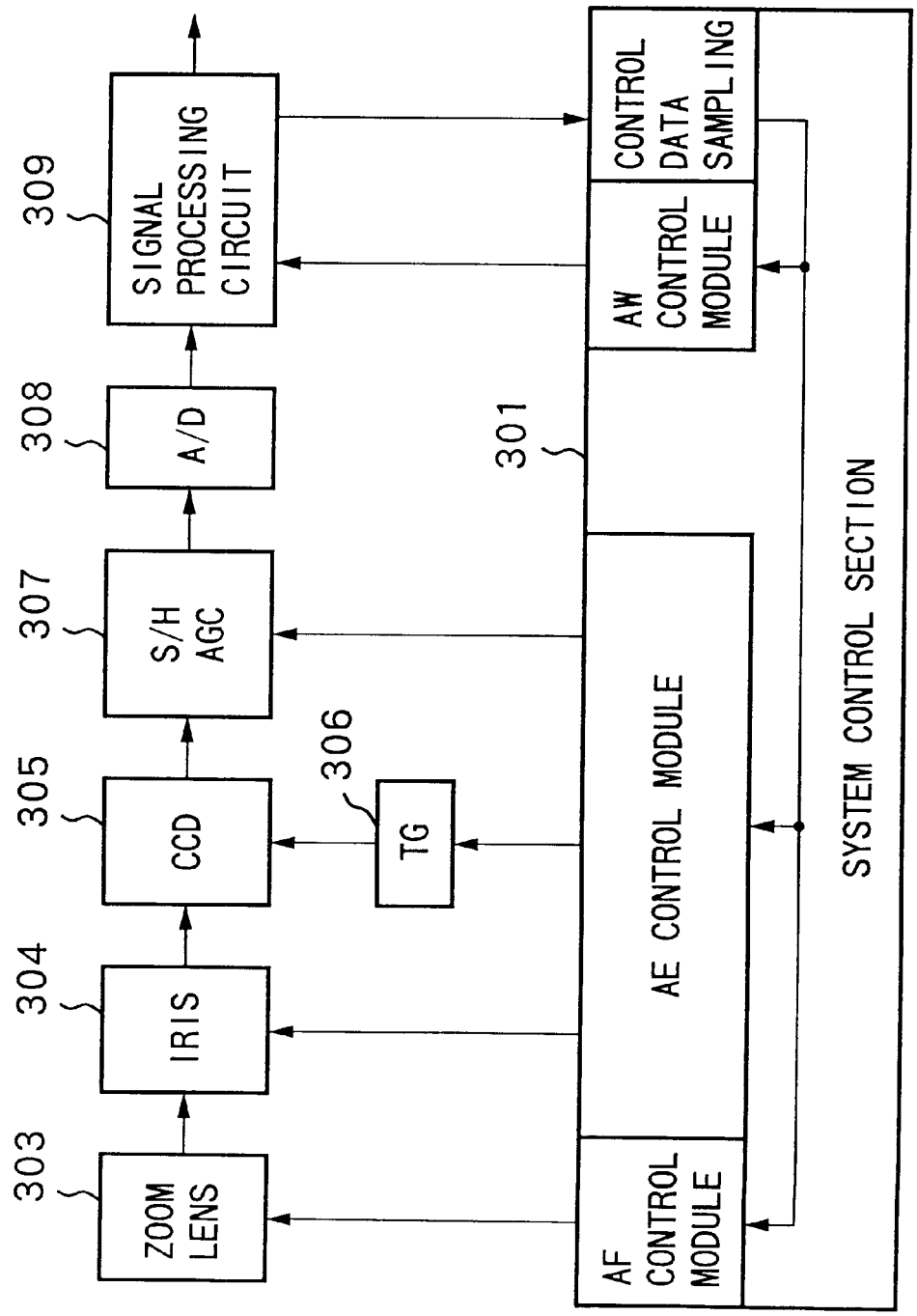
FIG. 28 describes a conventional image pickup apparatus.

FIG. 27 is a block diagram showing a configuration of a host computer section including the image processing section 5003 according to the tenth embodiment of the present invention.

The image processing section 5003 has a buffer circuit (BFF) 5042 to a signal line 5031; a clamp circuit (CLP) 5043; an A/D converter (A/D) 5044; a signal processing circuit (DSP) 5009 that provides digital signal processing such as filtering, color separation, gamma correction, matrix correction, or clipping that is required to photograph a color image; an image codec (CODEC) 5047 that converts a video signal into a format suitable for image communication; an MPU 5048; a processing (VIDS) circuit 5049 that transmits and receives control data in the vertical interval of the video signal; a synchronization separation circuit 5045; a synchronizing signal generator 5050; a burst gate circuit (BG) 5083; a PLL (Phase Locked Loop) circuit 5084; a regulator (REG) 5091 that regulates a voltage from 12 V to 5 V; an A/D converter 5052 for audio signals; and an audio codec (AUDIO CODEC) 5053.

The signal line 5031 transmits the same signal as in the signal line described above; a video signal on which a clock, a composite synchronizing signal, and controlling receive data are multiplexed is multiplexed on controlling transmit data transmitted from the image processing section 5003 to the camera section 5001. The signal line 5032 is a return signal line for the video signal on the signal line 5031. Reference numeral 5037 denotes an input signal line for an audio signal from the right stereo microphone, and numeral 5038 denotes an input signal line for an audio signal from the left stereo microphone. Reference numeral 5095 denotes a GND line corresponding to the shield portion of the multi-conductor cable 5094.

In addition, numeral 5060 denotes a host computer; 5062 denotes a monitor such as a CRT or a liquid crystal connected to the host computer 5060 to display various data and messages for the operator; 5063 denotes a keyboard operated by the operator to input various data and commands; 5064 denotes a mouse used as a pointing device; and 5065 denotes a speaker that reproduces and outputs sound input via the signal lines 5037 and 5038.

An operation of the image processing section 5003 according to this embodiment based on the above configuration is described.

A video signal input via the signal line 5031 is input to the BG circuit 5083; synchronization separation circuit 5045; and A/D converter 5044 via the buffer circuit (BFF) 5042 and clamp circuit (CLP) 5043.

The synchronization separation circuit 5045 separates and generates an HD signal (a horizontal synchronizing signal), a VD signal (a vertical synchronizing signal), and a burst gate pulse (BGP) from the video signal input from the clamp circuit 5043. Among these signals, the HD and VD signals are input to reset terminals of a horizontal and a vertical synchronization counters (not shown) in the synchronizing signal generator 5050 to provide horizontal and vertical synchronization with the camera section 5001. The HD and VD signals in synchronism with the operation of the camera section 5001 are input to the signal processing circuit (DSP) 5009 and processing circuit (VIDS) 5049.

Based on the burst gate pulse (BGP) generated by the synchronization separation circuit 5045, only a burst clock that has been added to the video signal input to the BG circuit 5083 is extracted from the signal and then input to the PLL circuit 5084. The PLL circuit 5084 generates a clock (CLK) from the burst clock input from the BG circuit 5083 and inputs it to the synchronizing signal generator 5050; A/D converter 5044; signal processing circuit (DSP) 5009; and processing circuit (VIDS) 5049.

The video signal input to the A/D converter 5044 is converted into a digital signal (in this case, 10 bits) in synchronism with the clock (CLK) from the PLL circuit 5084, and this digital signal is input to the signal processing circuit 5009 and processing circuit (VIDS) 5049.

The digital signal input to the signal processing circuit 5009 is subjected to digital signal processing such as filtering, color separation, gamma correction, matrix operation, or clipping that is required to photograph a color image, in synchronism with the clock (CLK) from the PLL circuit 5084 and the synchronizing signals (HD and VD) from the synchronizing signal generator 5050 and is then converted by the image codec (CODEC) 5047 into a format suitable for image communication with the host computer 5060.

The processing circuit (VIDS) 5049 executes processing in synchronism with the synchronizing signals (HD and VD) from the synchronizing signal generator 5050 and the clock (CLK) from the PLL circuit 5084, compares the digital signal input from the A/D converter 5044 to a reference digital value to detect control data (TX) from the camera section 5001 that has been multiplexed on the vertical interval of the video signal, and then transmits this data to the MPU 5048. In addition, the processing circuit multiplexed the control data (DATA(TX)) that has been received from the MPU 5048 and that is to be transmitted to the camera section 5001, on a specified vertical interval of the video signal received from the camera section 5001 and then transmits the signal obtained to the camera section 5001.

Reference numeral 5093 denotes a power source that generates a 12-V power supply voltage, and the regulator (REG) 5091 generates from this 12 V, 5 V for the digital IC of the image processing section 5003.

An audio signal input via the signal lines 5037 and 5038 is converted into a digital signal by the A/D converter 5052 and then converted by the audio codec 5053 into a format suitable for audio communication with the host computer 5060.

Reference numeral 5097 denotes a coupling capacitor for cutting a DC voltage from the shield portion 5095 of the multi-conductor shield cable 5094.

The tenth embodiment supplies a power supply voltage (in this case, +12 V) used by the camera section 5001 to this section 5001 via the return signal line 5032 and uses the signal line 5032 as a return signal line for the video signal transmitted through the signal line 5031. Since the video signal is subjected to alternate coupling, the voltage is multiplexed on the video signal return line 5032. The power supply voltage supplied via the signal line 5032 is cut from the GND by the coupling capacitor 5097 so that only the alternating return current of the video signal flows through the capacitor 5097 and video signal GND line 5095.

According to the tenth embodiment, the signal line 5031 through which the video signal is transmitted is connected to the signal line of the coaxial cable and the power supply voltage is connected to the shield line of the same coaxial cable.

The wiring pattern of the signal lines and the position of the coupling capacitor 5097 must be set so that the impedance of the route "the video signal line 5031 in the camera section 5001—the multi-conductor shield cable 5094—the video signal line 5031 in the image processing section 5003—the GND 5095 in the image processing section 5003—the coupling capacitor 5097 in the image processing section 5003—the return signal line 5032 in the multi-conductor shield cable 5094—the coupling capacitor 5096 in the camera section 5001—the signal GND 5095 in the camera section 5001" is much lower than that of the route "the video signal line 5031 in the camera section 5001—the multi-conductor shield cable 5094—the video signal line 5031 in the image processing section 5003—the GND 5095 in the image processing section 5003—the shield portion 5095 in the multi-conductor shield cable 5094—the GND 5095 in the camera section 5001".

Although the tenth embodiment uses the composite synchronizing signal as the synchronizing signal transmitted from the camera section 5001 to the image processing section 5003, a combination of the horizontal and vertical synchronizing signals may be used for this embodiment.

In addition, although the vertical interval is used for the timing for communication between the camera section 5001 and the image processing section 5003, the signal may be multiplexed on any position as long as the video signal is not affected. For example, similar effects can be obtained by multiplexing the signal on a horizontal synchronizing signal interval.

Although the tenth embodiment communicates data with a personal computer, it is applicable to a standalone apparatus with video outputs.

As described above, the tenth embodiment multiplexes the power supply voltage supplied from the image processing section 5003 to the camera section 5001, on the return signal line for the video signal transmitted from the camera section 5001 to the image processing section 5003 in order to eliminate the need for the signal line for a power supply.

This invention is applicable to either a system composed of multiple apparatuses (for example, a host computer, an interface device, a reader, and a printer) or a single apparatus (for example, a copier or a facsimile terminal device).

The objects of this invention can be achieved by supplying a system or an apparatus with a storage medium on which software program codes that implement the functions of the above embodiments are recorded and allowing a computer (or a CPU or an MPU) in the system or apparatus to read and execute the program codes stored in the storage medium.

In this case, the program codes read from the storage medium implement the functions of the above embodiments and the storage medium that stores the program codes constitutes this invention.

Storage media used to supply program codes include, for example, floppy discs, hard discs, optical discs, photo-electro-magnetic discs, CD-ROMs, CD-Rs, magnetic tapes, nonvolatile memory cards, and ROMs.

The functions of the above embodiments can be provided not only by executing the program codes read by the computer but also by allowing an operating system (OS) running on the computer to execute part or all of actual processing based on instructions from the program codes.

The functions of the above embodiments can also be provided by reading the program codes from the storage medium, writing them to a memory included in a function extension board inserted into the computer or a function extension unit connected to the computer, and allowing a CPU included in the function extension board or unit to execute part or all of actual processing based on instructions from the program codes.

As described above, the present embodiments multiplex the power line that supplies power from the image processing section to the camera section, on the GND line for the video signal transmitted from the camera section to the image processing section in order to eliminate the need for an exclusive line for a power supply, thereby simplifying the cables to reduce costs and improving operability.

Although the present embodiments include the power source 5093 in the image processing section 5003, this invention is not limited to this aspect, but the power source 5093 may be eliminated so that a power supply voltage is supplied by the host computer 5060 and transmitted to the camera section 5001 via the line 5032.

As many apparently widely different embodiments of the present invention can be made without departing from the spirit and scope thereof, it is to be understood that the invention is not limited to the specific embodiments thereof except as defined in the appended claims.

What is claimed is:

1. An image pickup apparatus, comprising:
   an image pickup section;
   a detector adapted to detect the burst clock superimposed on the multiplexed video signal based on the signal passed through said filter; and
   a processor adapted to process the video signal input by said input circuit based on the frequency of the burst clock detected by said detector.

2. An image pick up apparatus, comprising:
   an image pickup section;
   an input circuit for inputting from said image pickup section a multiplexed video signal to which a burst clock and a synchronizing signal are multiplexed;
   a synchronization separator for separating the synchronizing signal from said multiplexed video signal input by said input circuit;
   a burst detector for detecting the burst clock superposed on the multiplexed video signal based on the synchronizing signal separated by said synchronization separator; and
   a processor for processing the video signal input by input circuit depending on the frequency of the burst detected by said burst detector,
   a phase comparator for comparing a phase of a clock with a phase of the burst clock detected by said burst detector;
   a lowpass filter for averaging an output from said phase comparator;
   a plurality of voltage-controlled oscillators for controlling an oscillating frequency based on the output from said lowpass filter; and
   a switching circuit for selecting one of the plurality of voltage-controlled oscillators to input to said phase comparator as the clock.

3. An image pickup apparatus according to claim 1, wherein a frequency of a signal passed through said band pass filter corresponds to the resolution of an image pickup element used in said image pickup section.

4. An image pickup apparatus according to claim 2, wherein the center oscillating frequency of said voltage-controlled oscillator corresponds to the resolution of the image pickup element used in said image pickup section.

5. An image pickup apparatus, comprising:
   an image pickup section;
   an input circuit adapted to input from said image pickup section a multiplexed video signal to which a burst clock and a synchronizing signal are multiplexed;
   a synchronization separator adapted to separate the synchronizing signal from the multiplexed video signal input by said input circuit;
   a filter adapted to pass a signal having a predetermined frequency;
   an input circuit for inputting from said image pickup section a multiplexed video signal to which a burst clock and a synchronizing signal are multiplexed;
   a synchronization separator for separating the synchronizing signal from said multiplexed video signal input by said input circuit;
   a burst detector for detecting the burst clock superposed on the multiplexed video signal based on the synchronizing signal separated by said synchronization separator; and
   a processor for processing the video signal input by input circuit depending on the frequency of the burst detected by said burst detector,
   wherein said burst detector further comprises:
      a band pass filter for passing a signal of a predetermined frequency; and
      a detector for detecting the superposed burst clock based on the signal passing through said band pass filter.

* * * * *

UNITED STATES PATENT AND TRADEMARK OFFICE
CERTIFICATE OF CORRECTION

PATENT NO. : 6,437,824 B1
DATED : August 20, 2002
INVENTOR(S) : Yasuo Suzuki et al.

It is certified that error appears in the above-identified patent and that said Letters Patent is hereby corrected as shown below:

Title page, Item [54] and Column 1, line 1,
The title should read as follows: -- IMAGE PICKUP APPARATUS --

Column 9,
Line 15, "189. Ace One" should read -- 189. One --

Column 12,
Line 21, "(in this. case, 6.2 V)" should read -- (in this case, 6.2 V) --

Column 17,
Line 60, "SSG and SP" should read -- SSG and DSP --
Line 61, "is he same" should read -- is the same --

Column 20,
Line 60, "reference-voltage" should read -- reference voltage --

Column 33,
Lines 49-57,

Claim 1 should read as follows:
1. An image pickup apparatus, comprising:
an image pickup section;
an input circuit for inputting from said image pickup section a multiplexed video signal to which a burst clock and a synchronizing signal are multiplexed;
a synchronization separator for separating the synchronizing signal from said multiplexed video signal input by said input circuit;
a burst detector for detecting the burst clock superposed on the multiplexed video signal based on the synchronizing signal separated by said synchronization separator; and
a processor for processing the video signal input by input circuit depending on the frequency of the burst detected by said burst detector,
wherein said burst detector further comprises:
a band pass filter for passing a signal of a predetermined frequency; and
a detector for detecting the superposed burst clock based on the signal passing through said band pass filter.

UNITED STATES PATENT AND TRADEMARK OFFICE
CERTIFICATE OF CORRECTION

PATENT NO. : 6,437,824 B1
DATED : August 20, 2002
INVENTOR(S) : Yasuo Suzuki et al.

It is certified that error appears in the above-identified patent and that said Letters Patent is hereby corrected as shown below:

Column 34,
Lines 31-61,

Claim 5 should read as follows:
5. An image pickup apparatus, comprising:
  an image pickup section;
  an input circuit adapted to input from said image pickup section a multiplexed video signal to which a burst clock and a synchronizing signal are multiplexed;
  a synchronization separator adapted to separate the synchronizing signal from the multiplexed video signal input by said input circuit;
  a filter adapted to pass a signal having a predetermined frequency;
  a detector adapted to detect the burst clock superimposed on the multiplexed video signal based on the signal passed through said filter; and
  a processor adapted to process the video signal input by said input circuit based on the frequency of the burst clock detected by said detector.

Signed and Sealed this

Twenty-fifth Day of February, 2003

JAMES E. ROGAN
*Director of the United States Patent and Trademark Office*